United States Patent [19]
Pon

[11] Patent Number: 5,966,403
[45] Date of Patent: Oct. 12, 1999

[54] CODE MULTIPATH ERROR ESTIMATION USING WEIGHTED CORRELATIONS

[75] Inventor: Rayman W. Pon, Cupertino, Calif.

[73] Assignee: Trimble Navigation Limited, Sunnyvale, Calif.

[21] Appl. No.: 08/683,859

[22] Filed: Jul. 19, 1996

[51] Int. Cl.[6] .............................. H04B 15/00; H04K 1/00; H04L 27/30
[52] U.S. Cl. .......................... 375/208; 375/207; 375/209
[58] Field of Search .................................. 375/207, 208, 375/209, 210, 267, 343; 370/515

[56] References Cited

U.S. PATENT DOCUMENTS

| | | | |
|---|---|---|---|
| 3,614,623 | 10/1971 | McAuliffe | 325/42 |
| 4,530,103 | 7/1985 | Mosley, Jr. et al. | 375/1 |
| 5,081,643 | 1/1992 | Schilling | 375/1 |
| 5,268,927 | 12/1993 | Dimos et al. | 375/1 |
| 5,285,279 | 2/1994 | Sakamoto et al. | 348/614 |
| 5,315,615 | 5/1994 | DeLisle et al. | 375/1 |
| 5,347,536 | 9/1994 | Meehan | 375/1 |
| 5,375,141 | 12/1994 | Takahashi | 375/1 |
| 5,402,441 | 3/1995 | Washizu et al. | 375/208 |
| 5,414,729 | 5/1995 | Fenton | 375/209 |
| 5,495,499 | 2/1996 | Fenton et al. | 375/205 |
| 5,504,781 | 4/1996 | Wolf | 375/242 |
| 5,524,023 | 6/1996 | Tsujimoto | 375/232 |
| 5,568,523 | 10/1996 | Tsujimoto | 375/347 |
| 5,574,754 | 11/1996 | Kurihara et al. | 375/367 |
| 5,576,659 | 11/1996 | Kenington et al. | 330/52 |
| 5,610,984 | 3/1997 | Lennen | 380/49 |
| 5,638,362 | 6/1997 | Dohi et al. | 370/342 |
| 5,659,574 | 8/1997 | Durrant et al. | 375/206 |
| 5,692,018 | 11/1997 | Okamoto | 375/347 |

*Primary Examiner*—Stephen Chin
*Assistant Examiner*—Mohammad Ghayour
*Attorney, Agent, or Firm*—Boris G. Tankhilevich

[57] ABSTRACT

The apparatus and method for minimization the residual multipath distortion signal present in the received spread spectrum signal are disclosed. In the preferred embodiment, the apparatus comprises a generator of non-uniform weighting function used for estimation and actual minimization of the residual multipath signal.

28 Claims, 30 Drawing Sheets

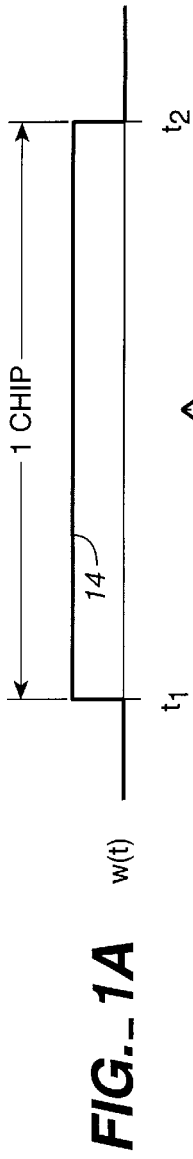
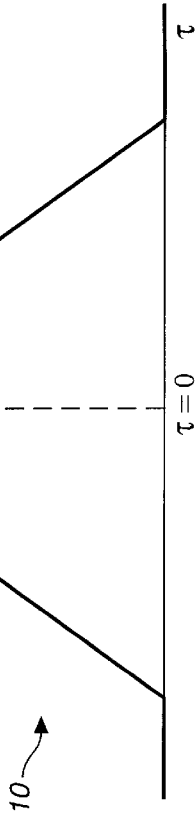
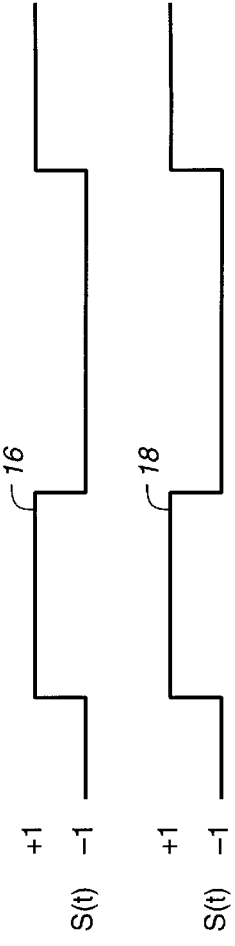
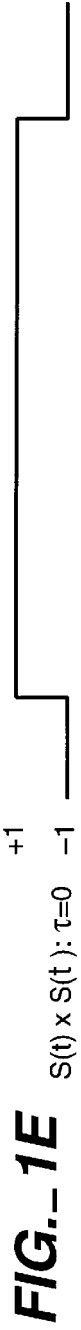

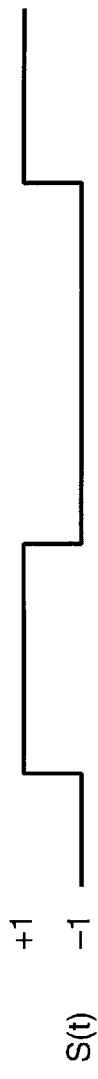
S(t)
FIG._2A
$S(t-\tau_1)$
FIG._2B
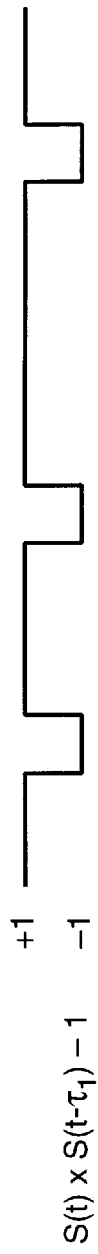
$S(t) \times S(t-\tau_1) - 1$
FIG._2C
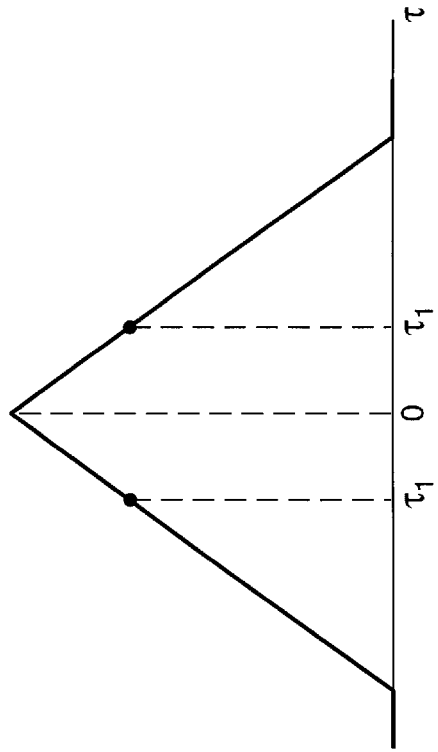
$\int S(t)\,S(t-\tau_1)\,dt < \int S(t)\,S(t-0)\,dt$
FIG._2D

FIG._3A
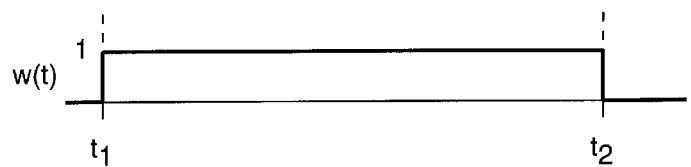
FIG._3B
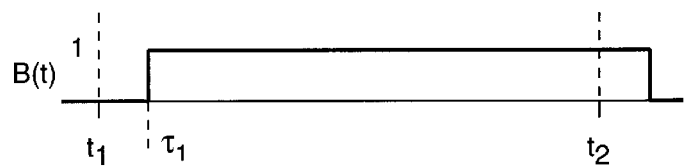
FIG._3C
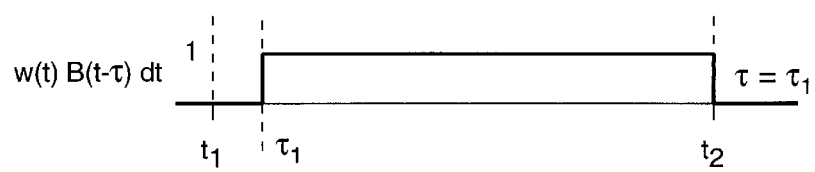

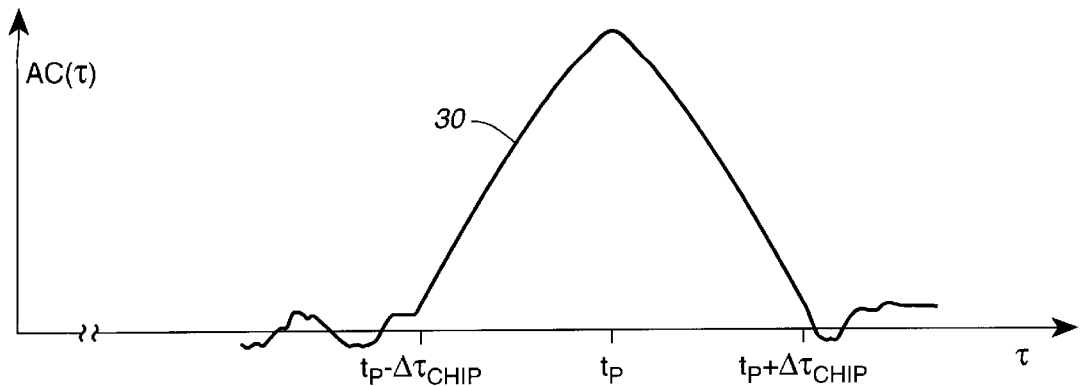
FIG._4A
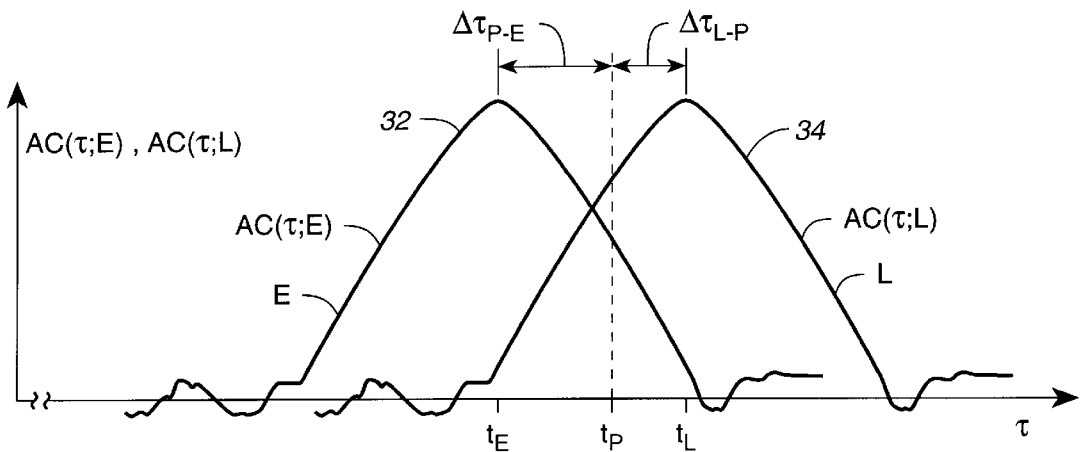
FIG._4B
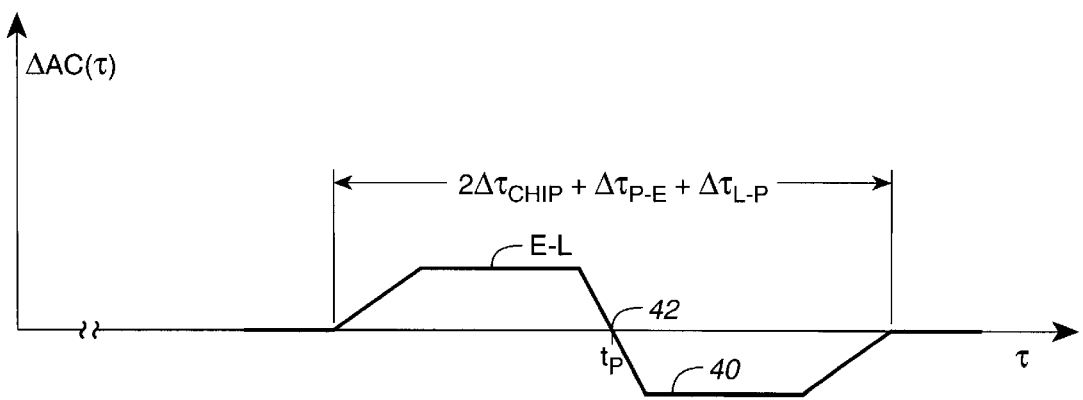
FIG._4C

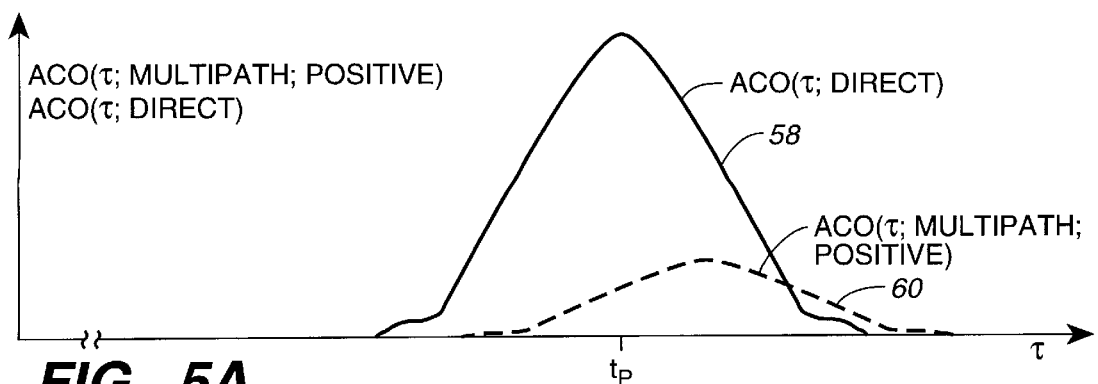
FIG._5A
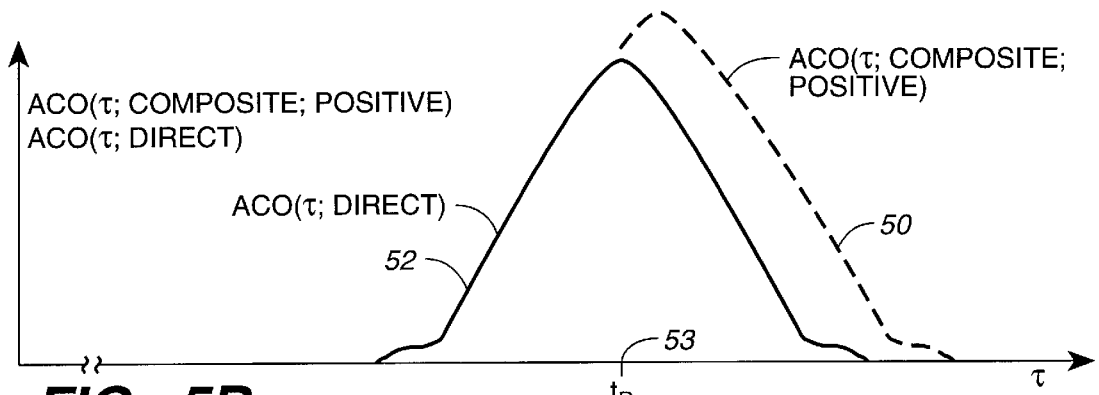
FIG._5B
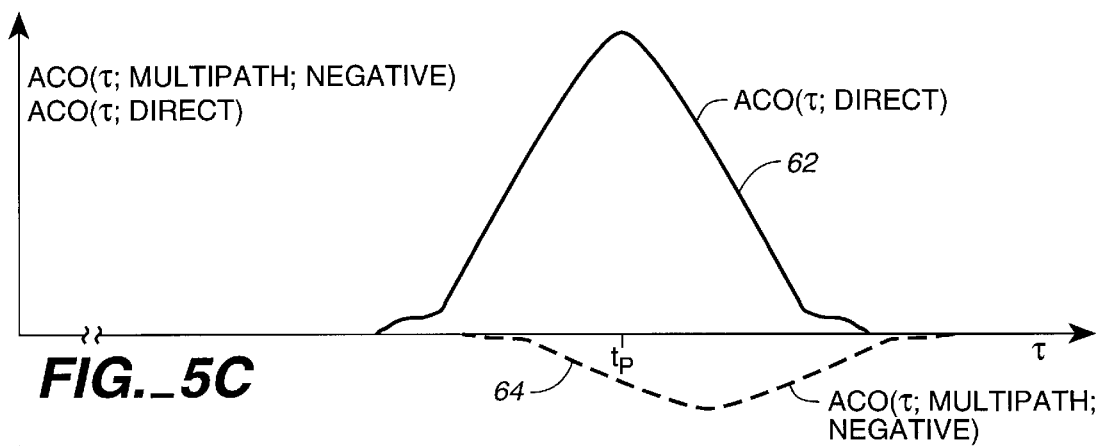
FIG._5C
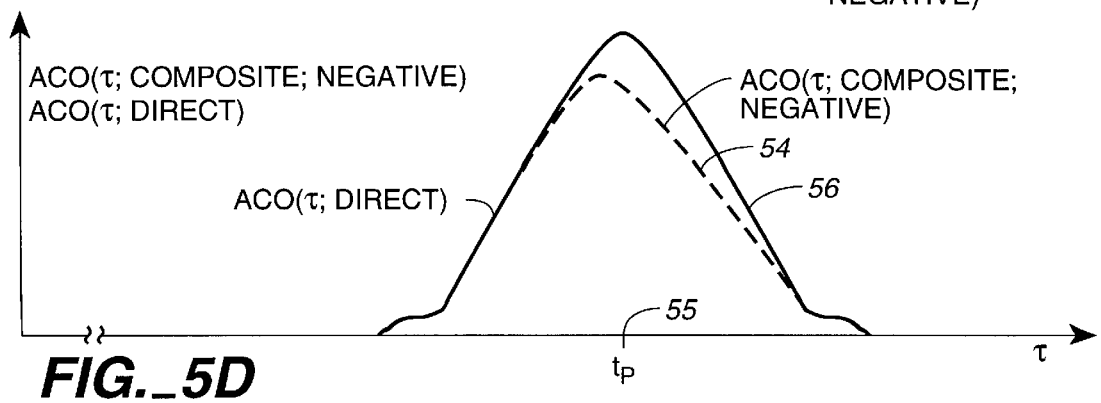
FIG._5D

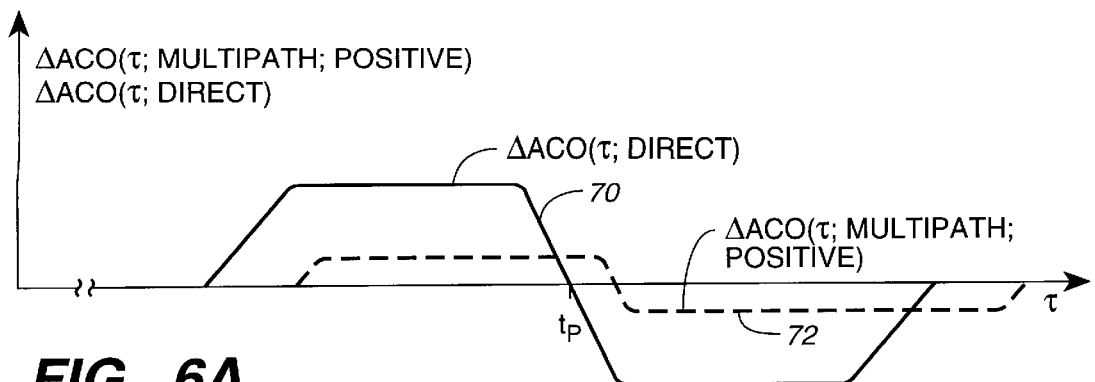
FIG._6A
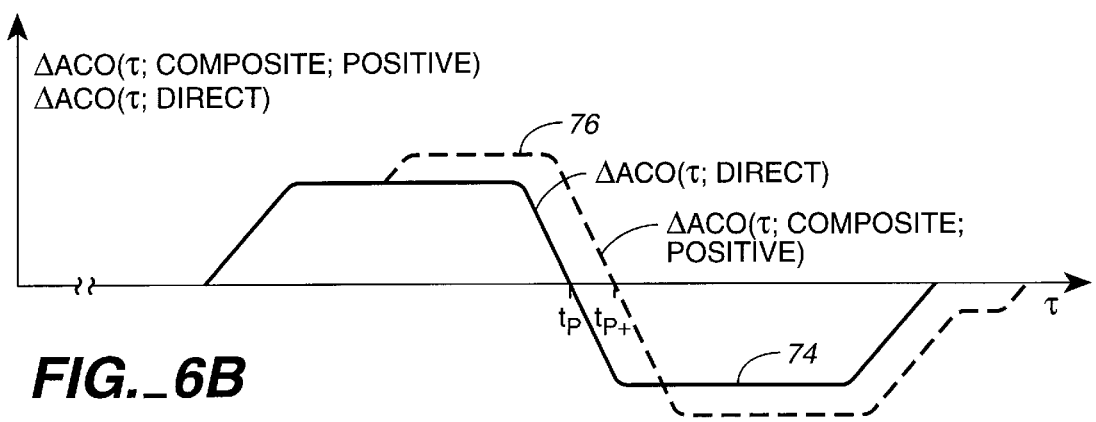
FIG._6B
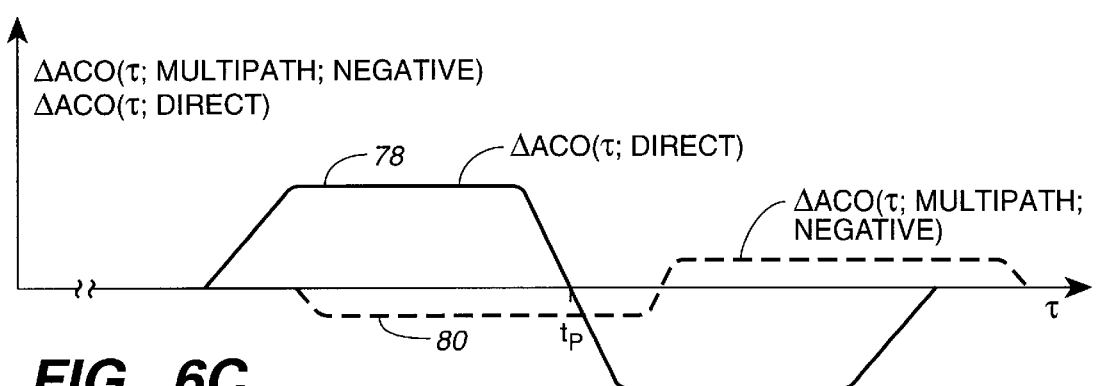
FIG._6C
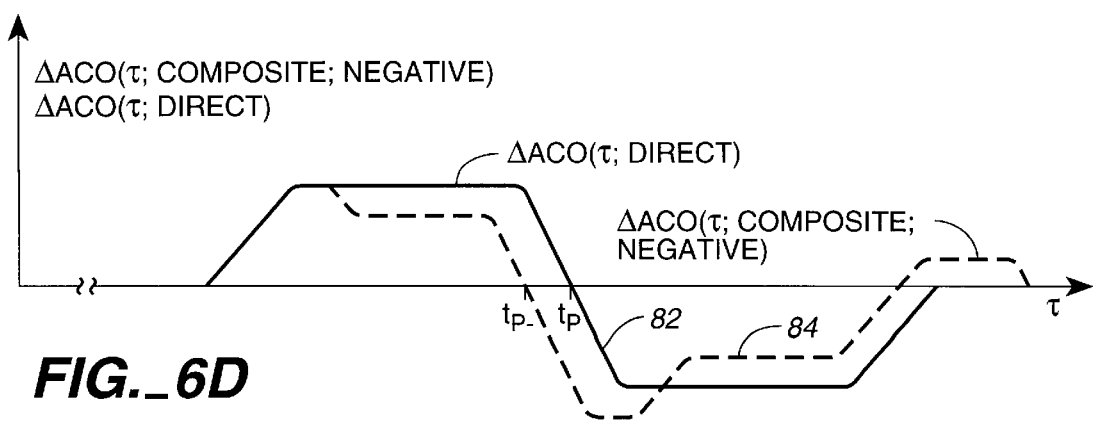
FIG._6D

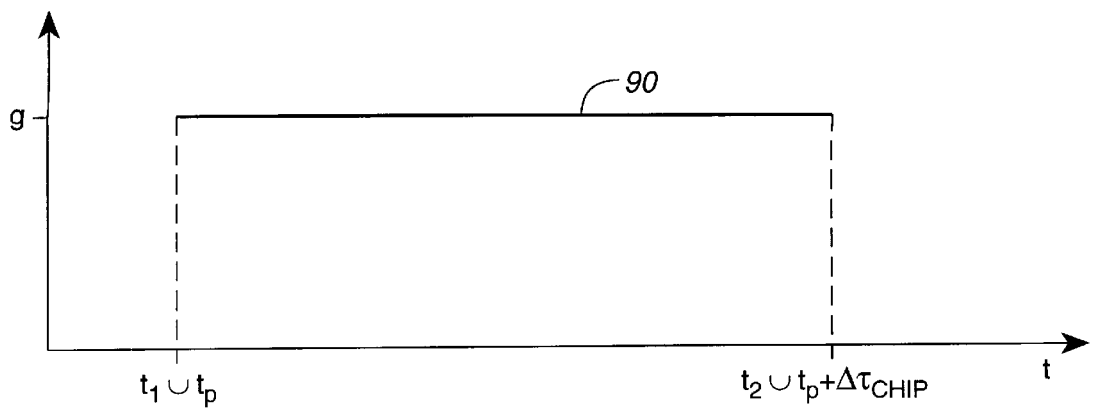
FIG._7A
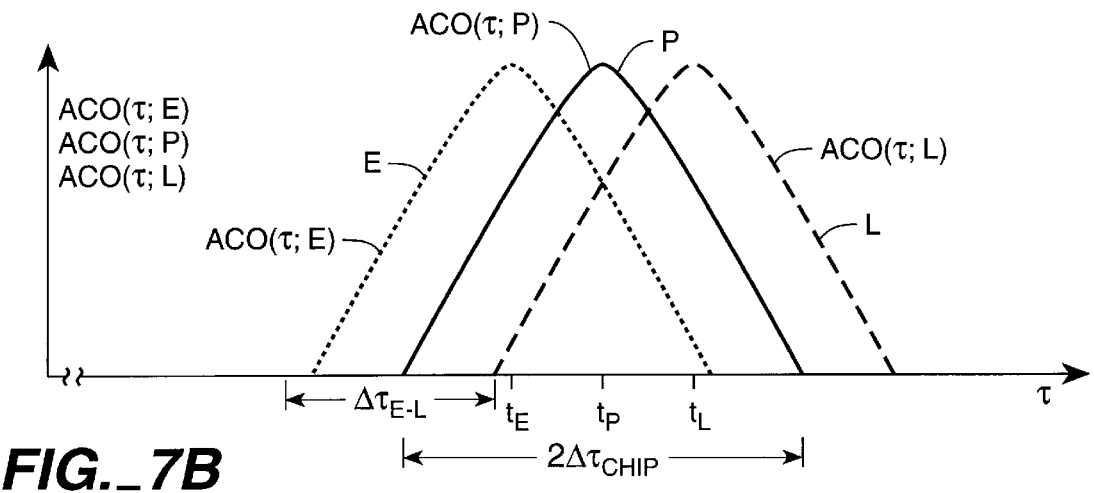
FIG._7B
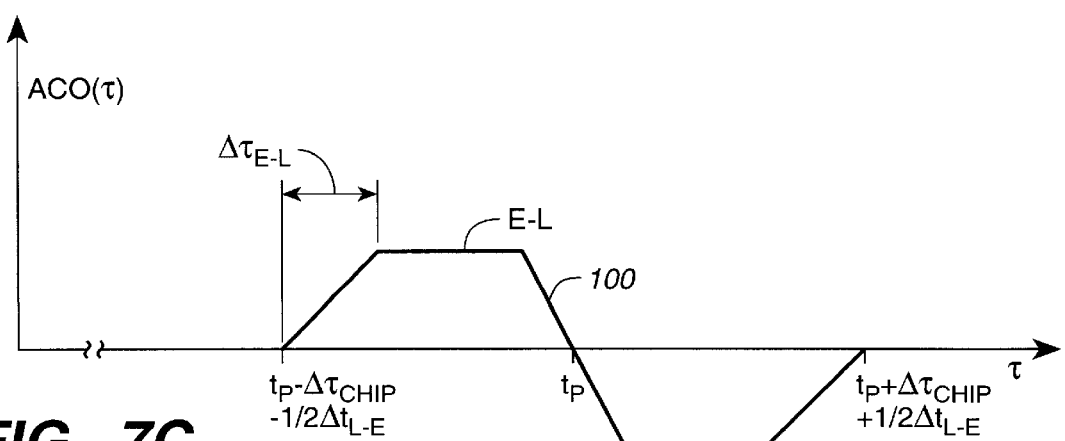
FIG._7C

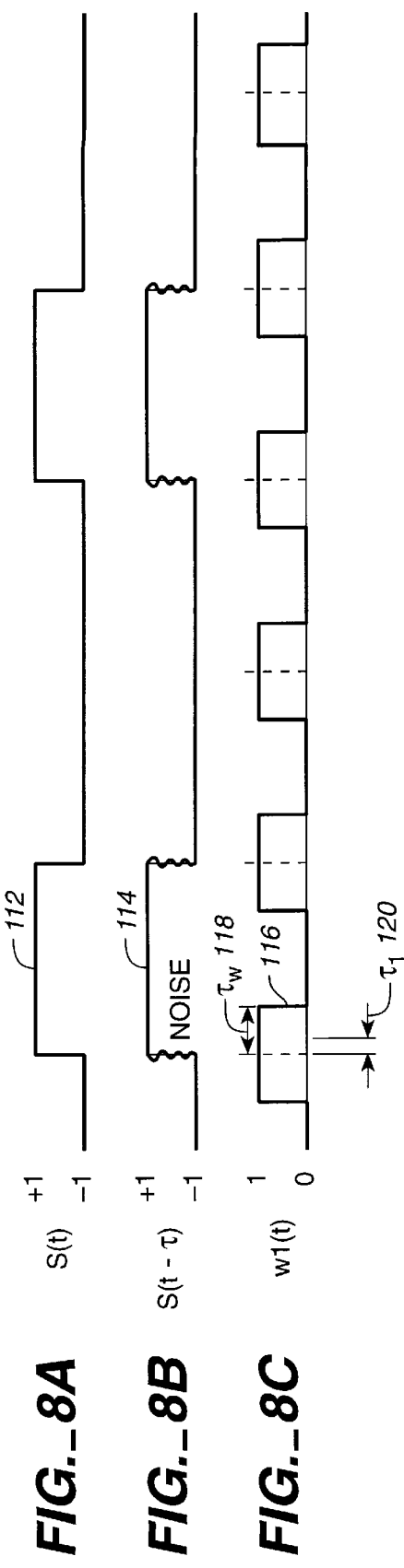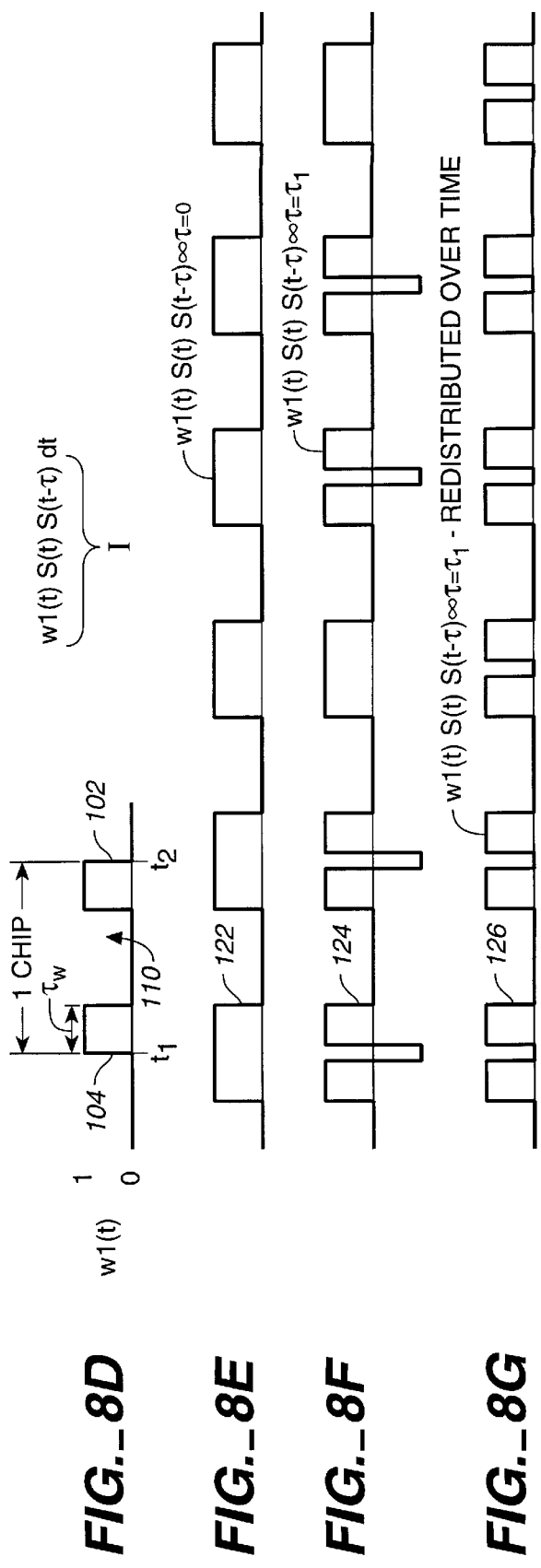

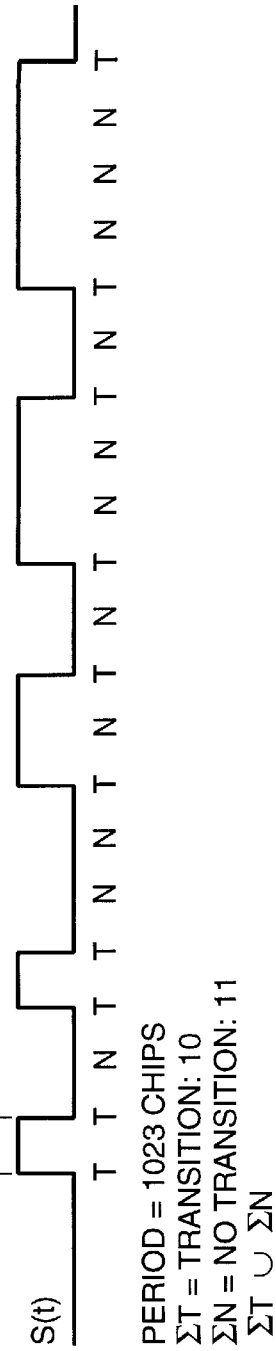
FIG._9
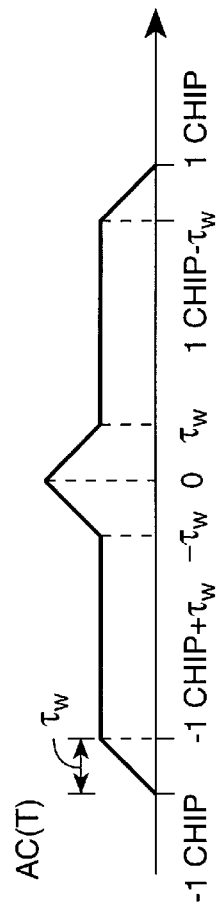
FIG._11A
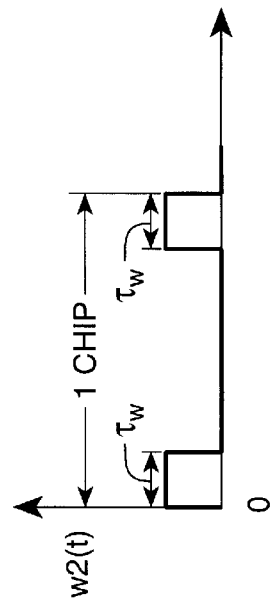
FIG._11B

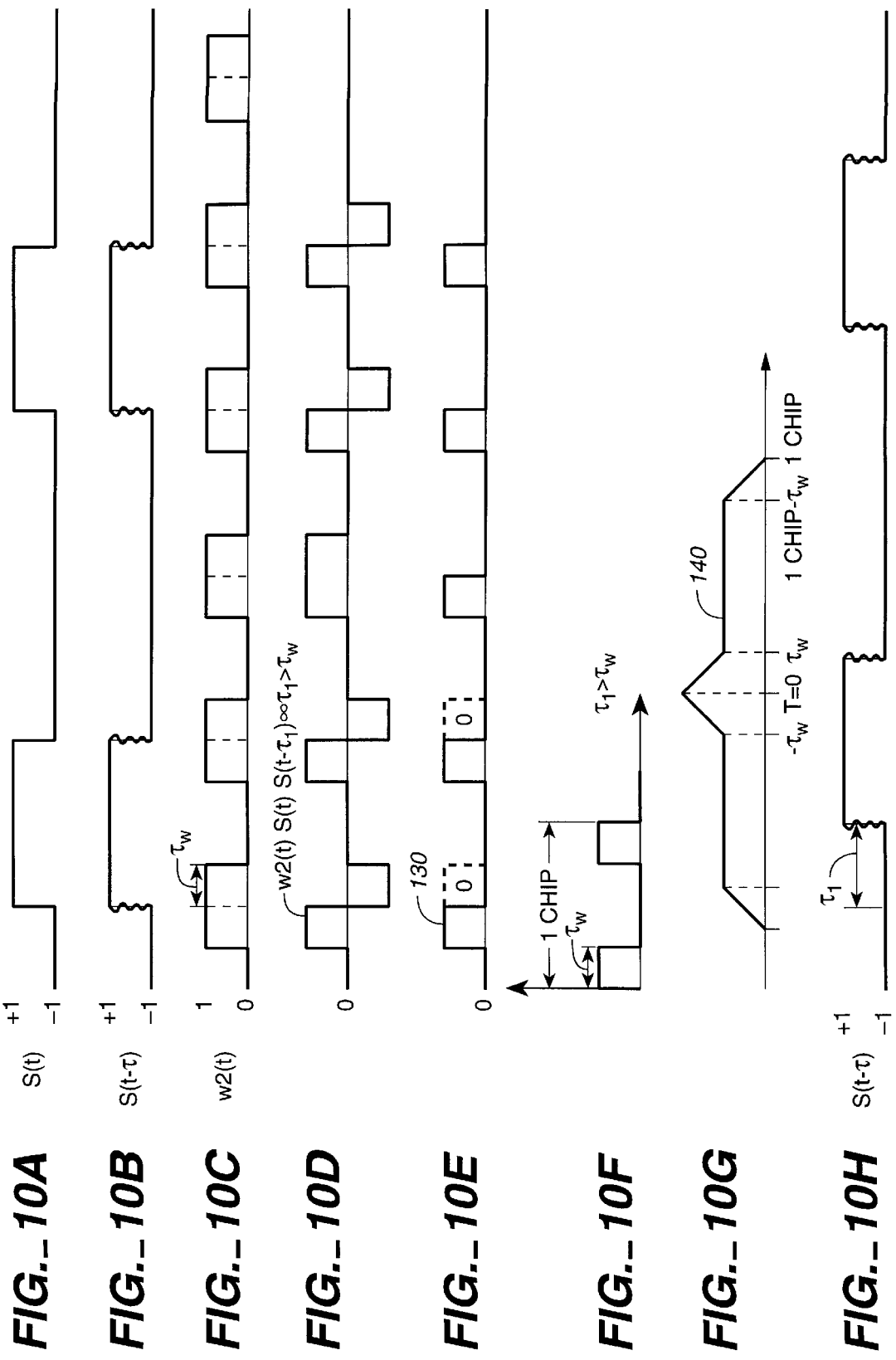

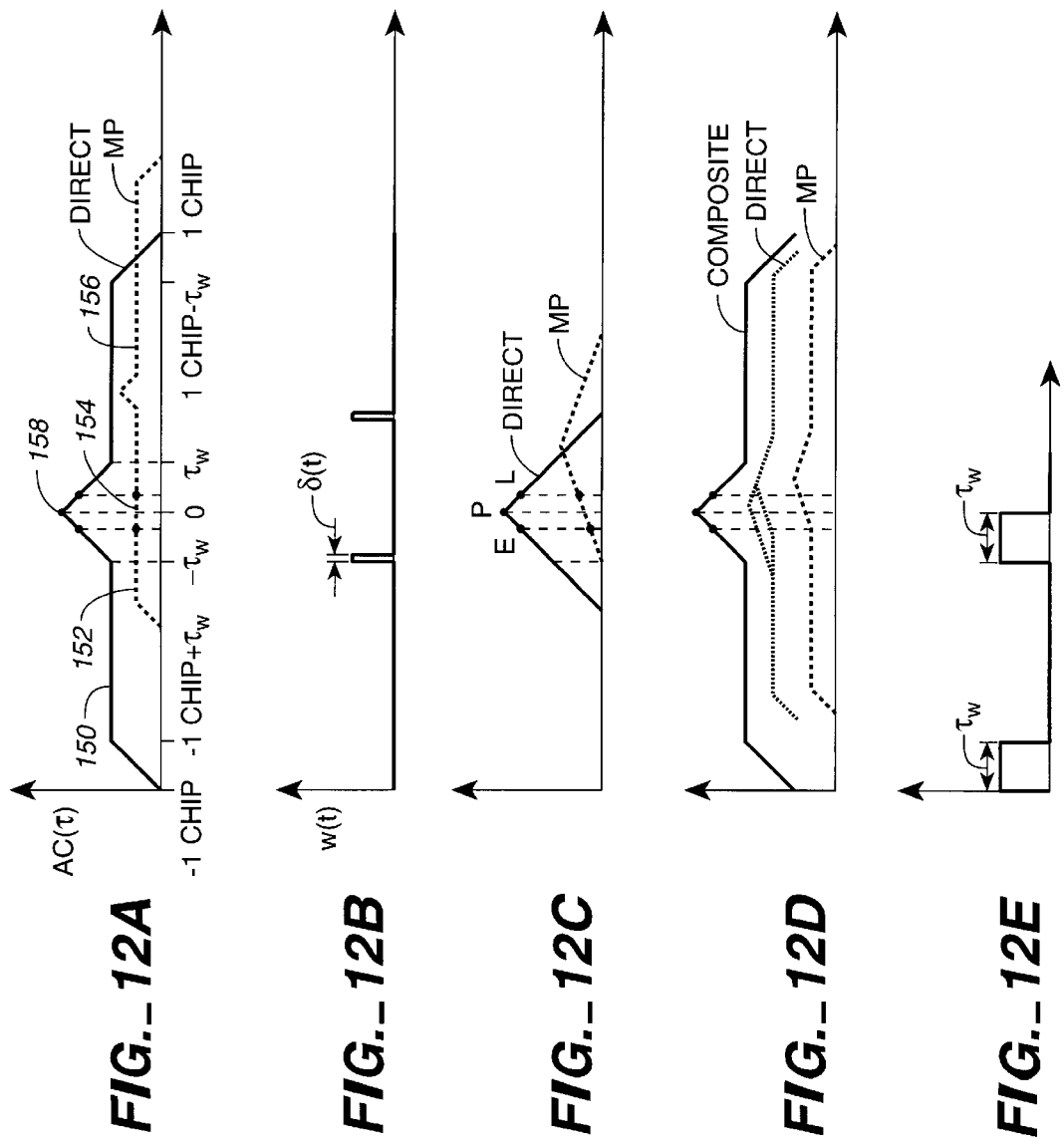

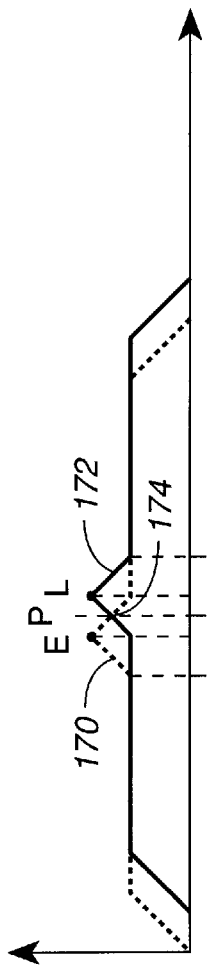
FIG._13A
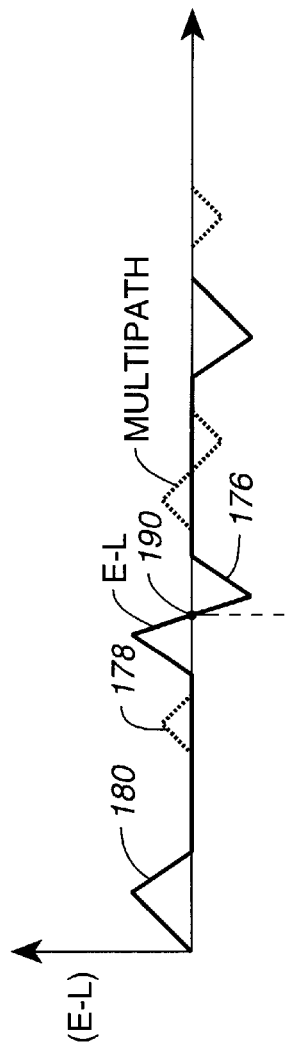
FIG._13B
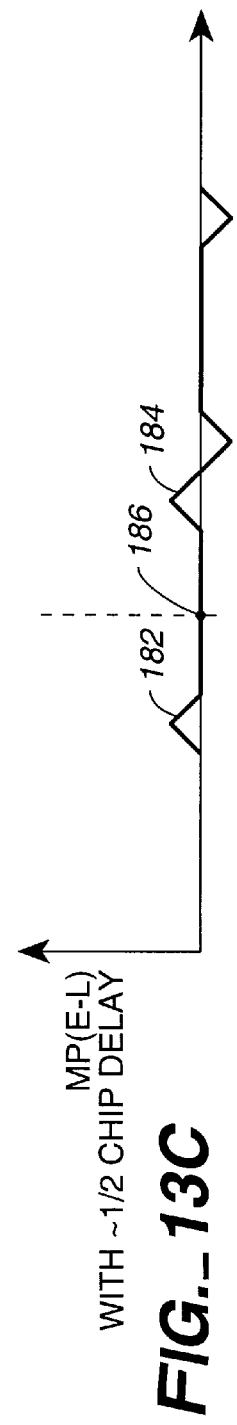
FIG._13C

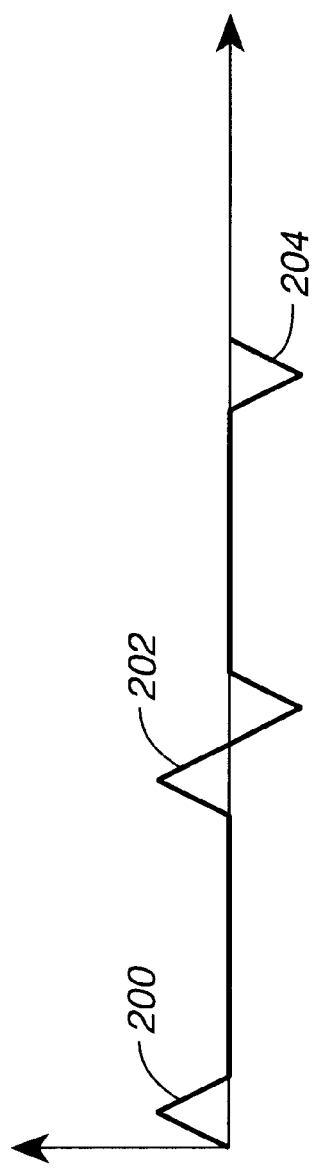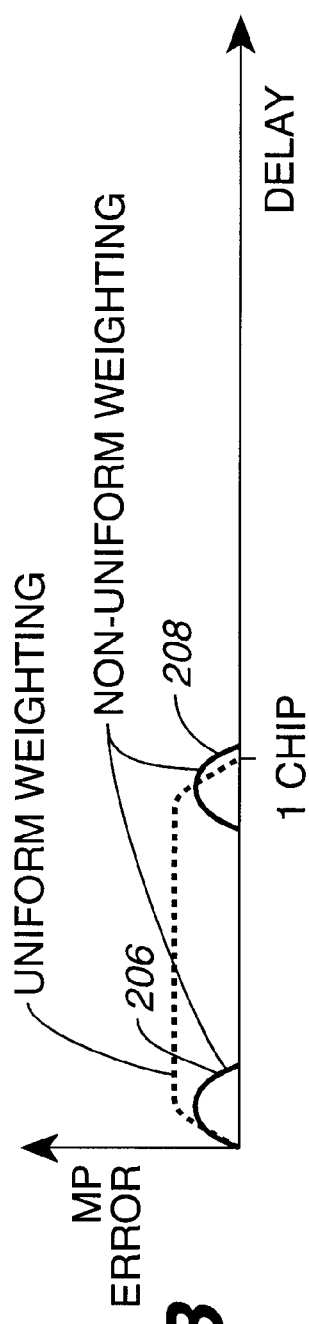
FIG._14A
FIG._14B

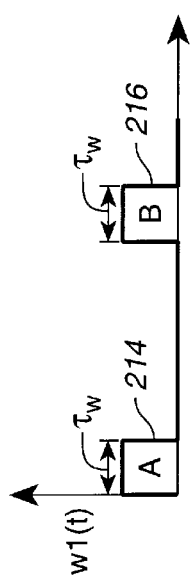
FIG._15A
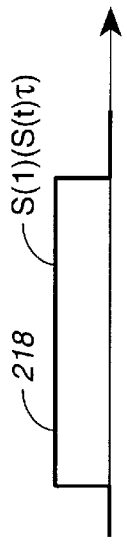
FIG._15B
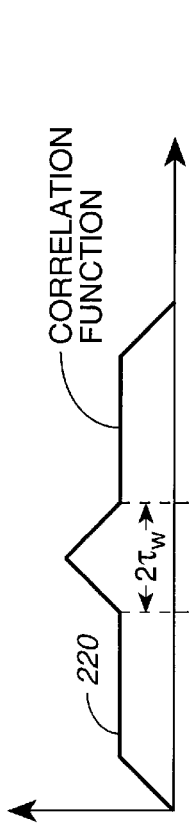
FIG._15C
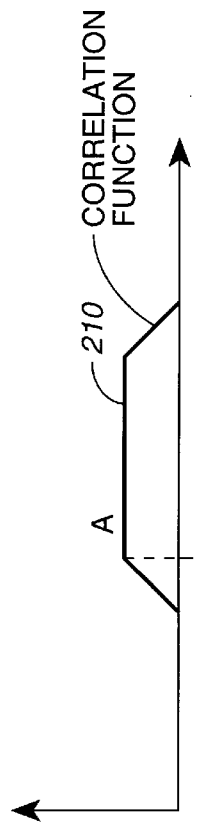
FIG._15D
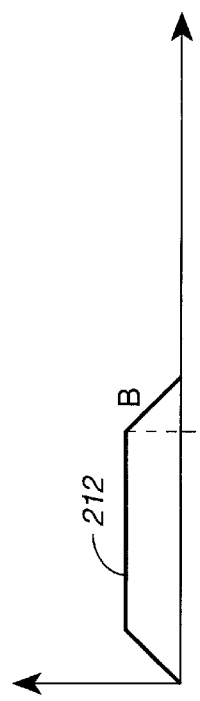
FIG._15E

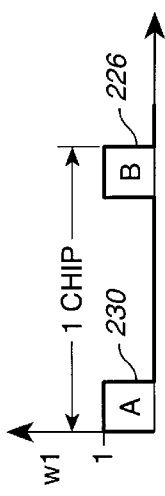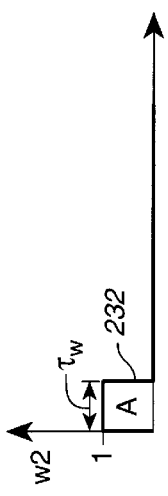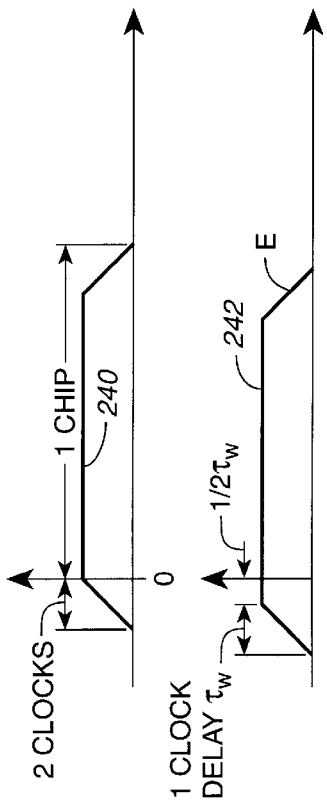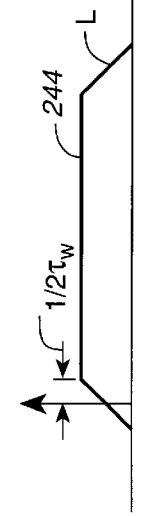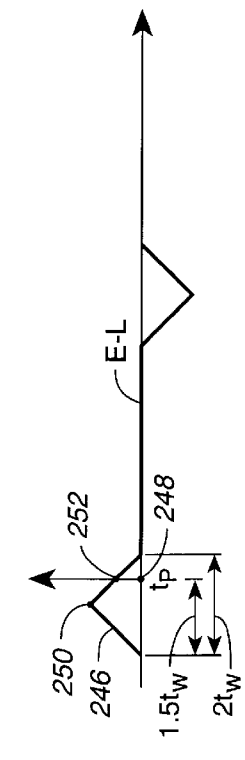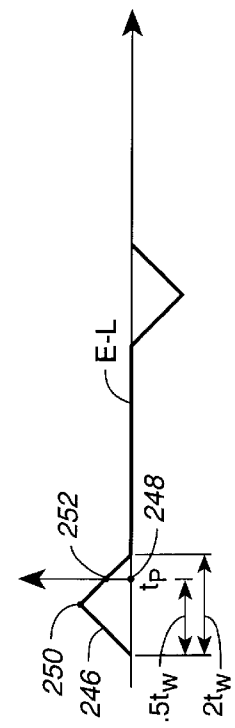
FIG._16A  FIG._16B  FIG._16C  FIG._16D  FIG._16E  FIG._16F

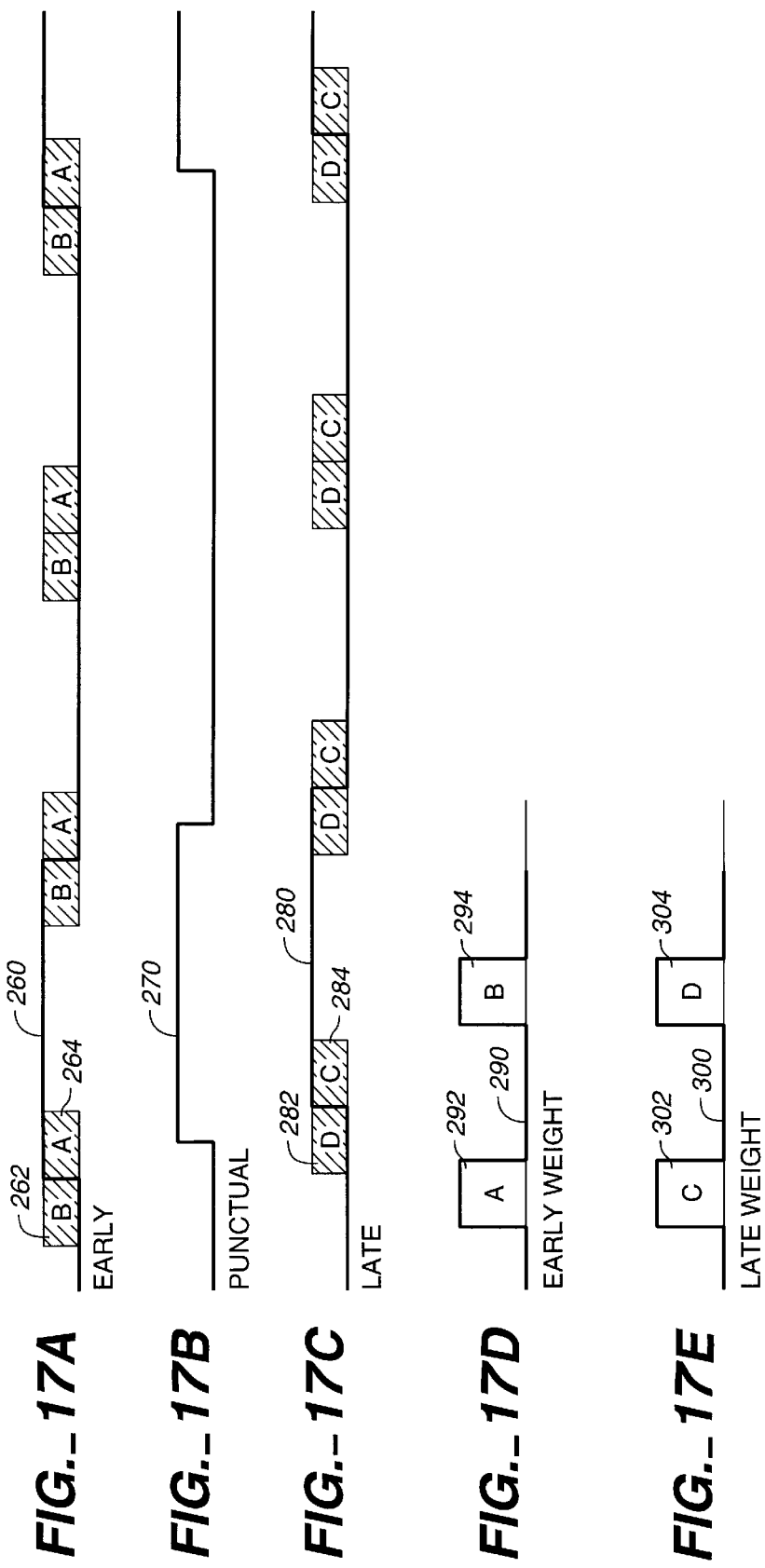

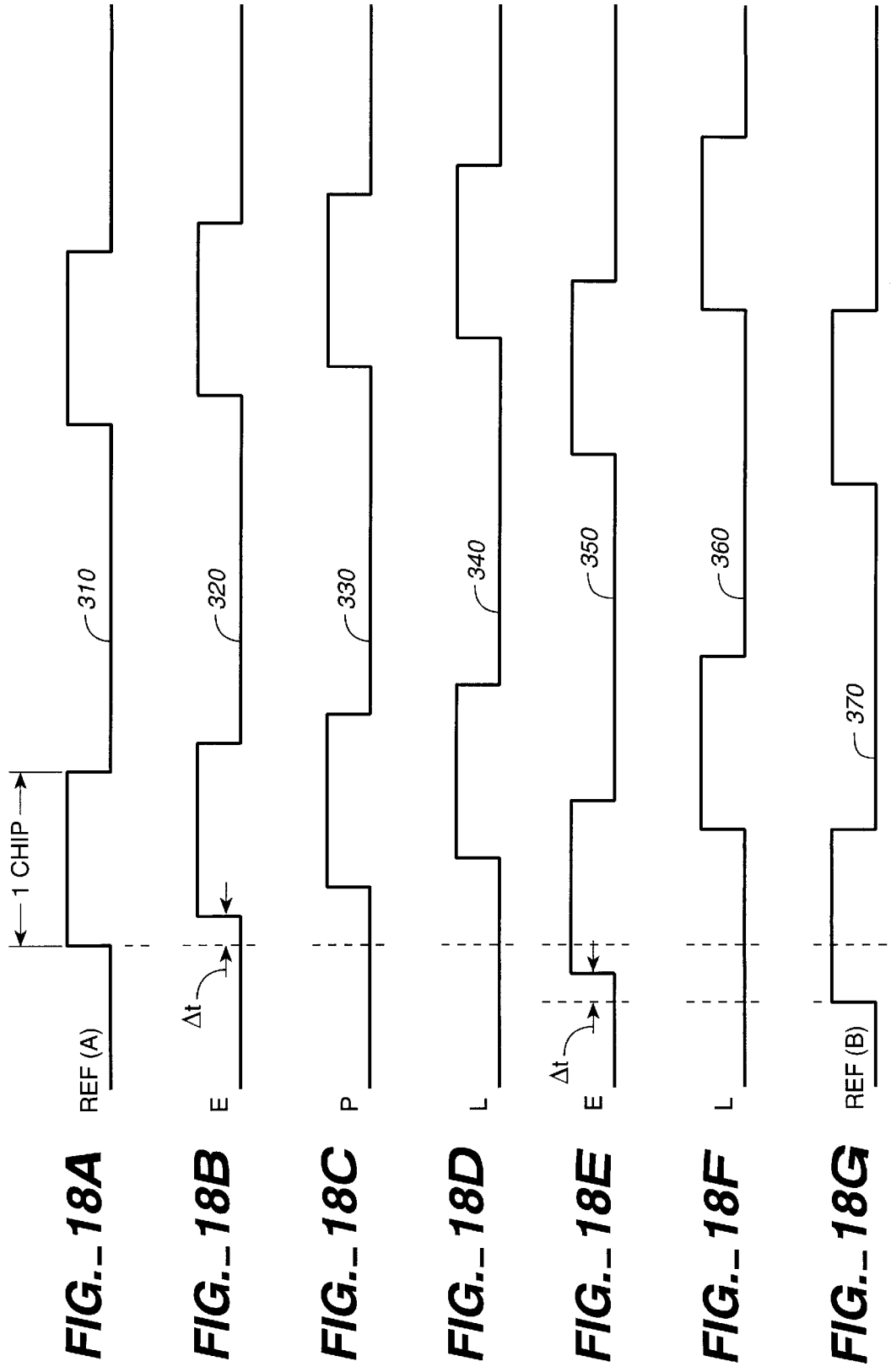

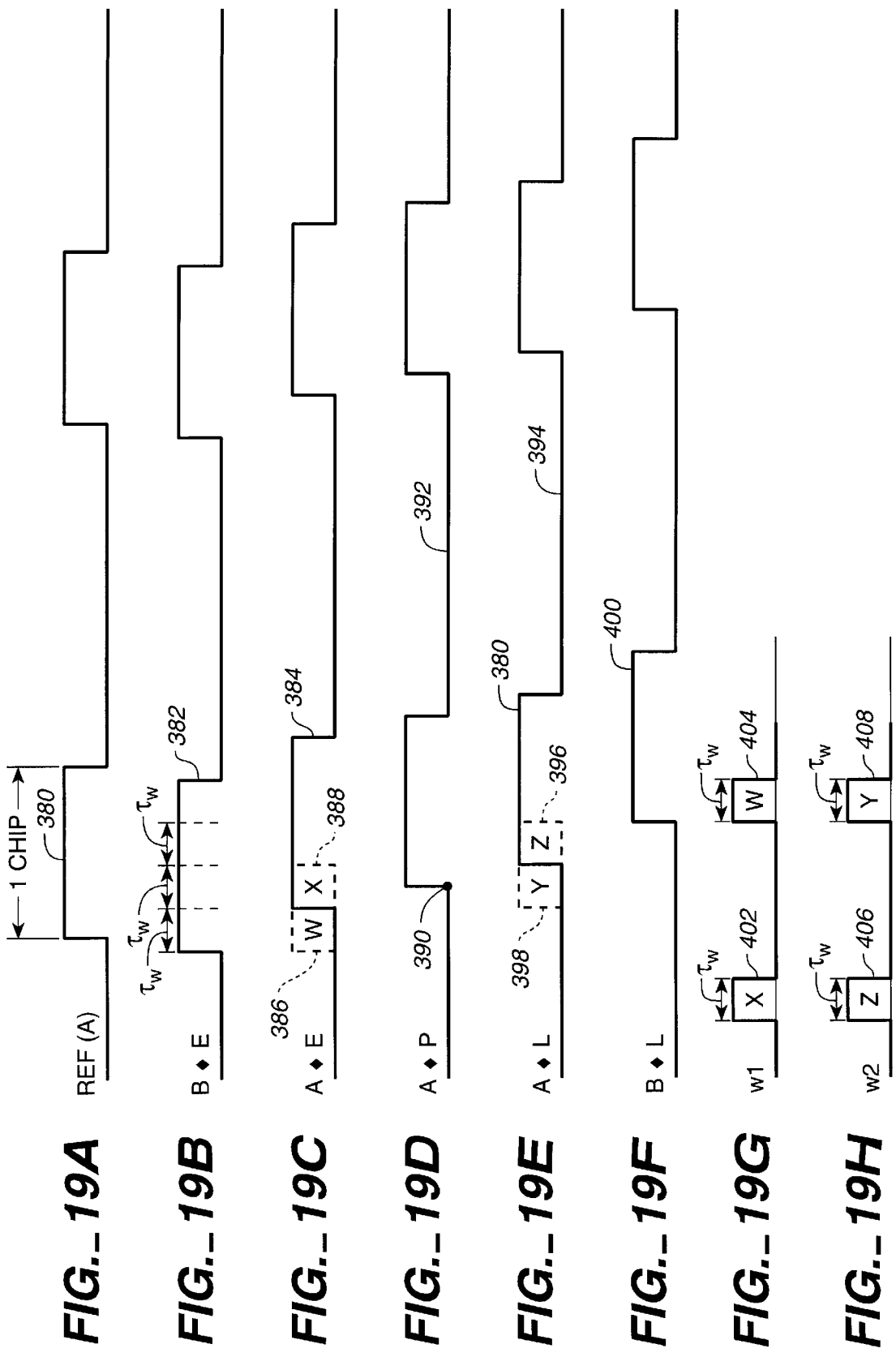

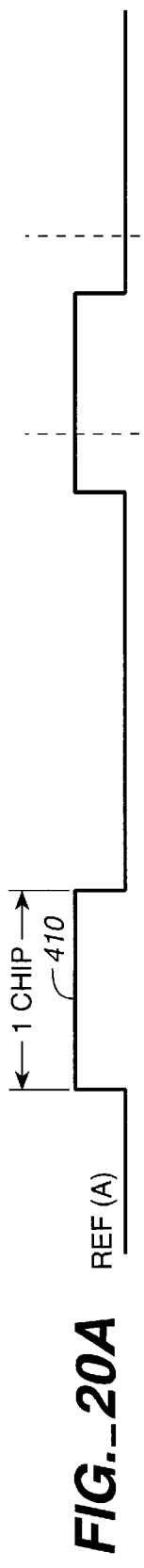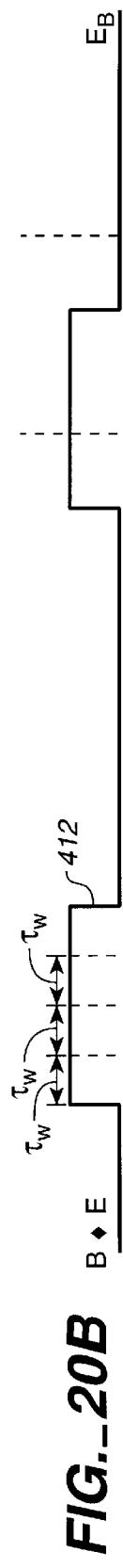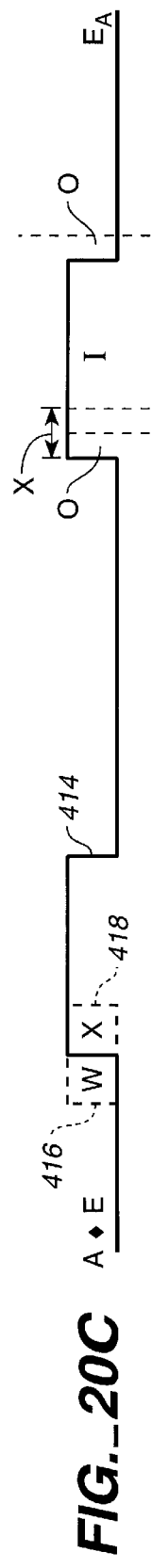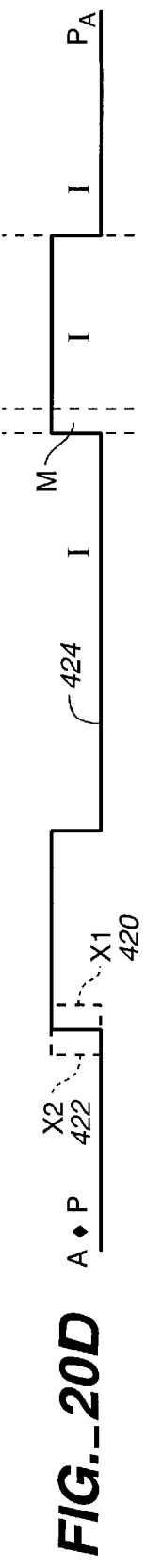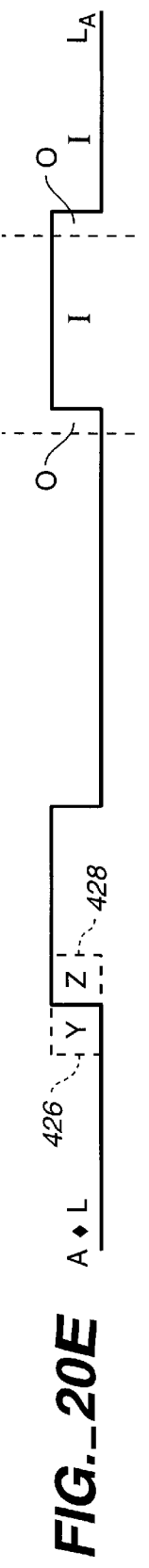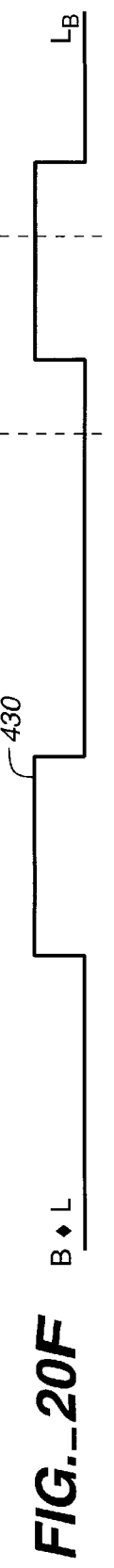
FIG._20A  FIG._20B  FIG._20C  FIG._20D  FIG._20E  FIG._20F

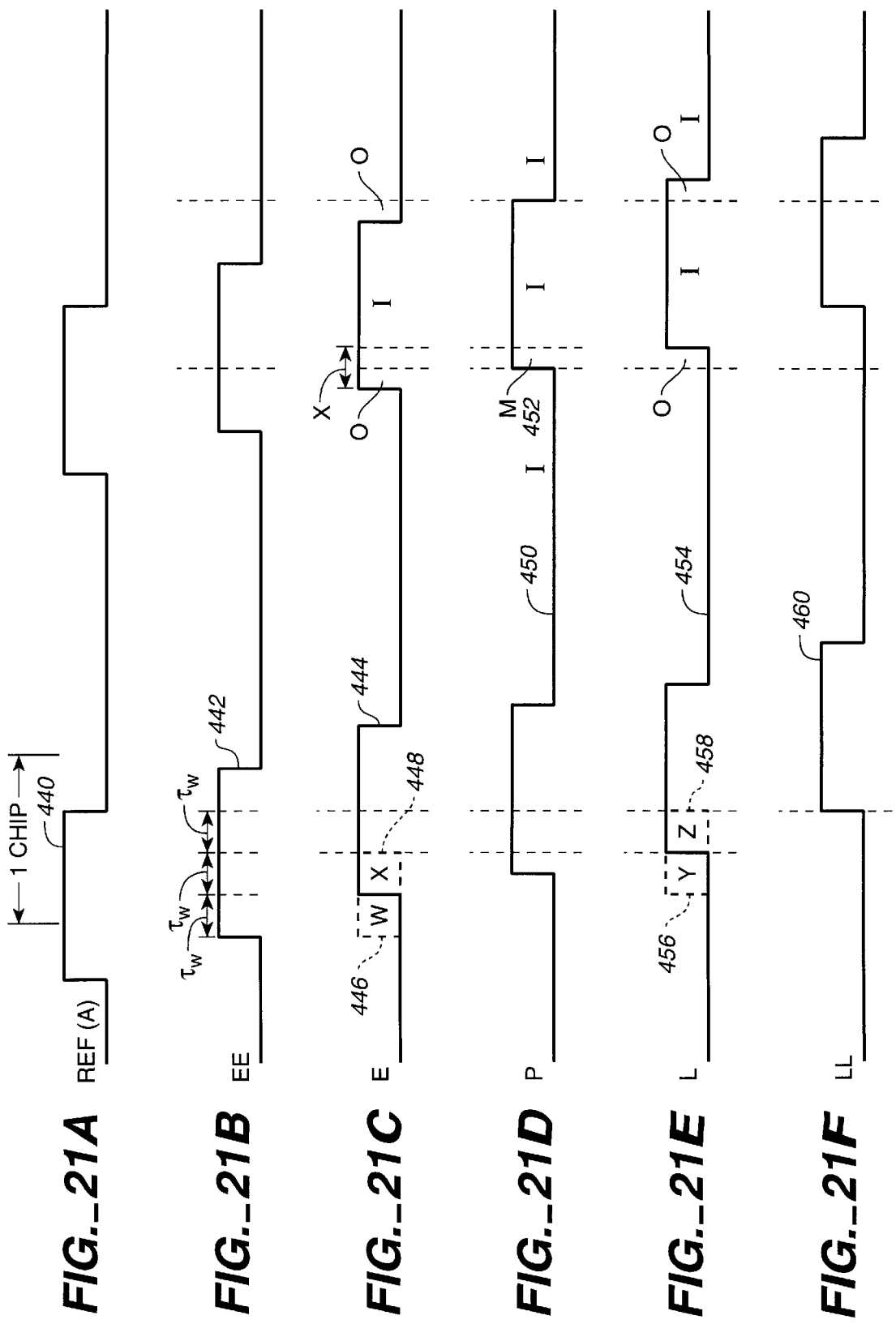

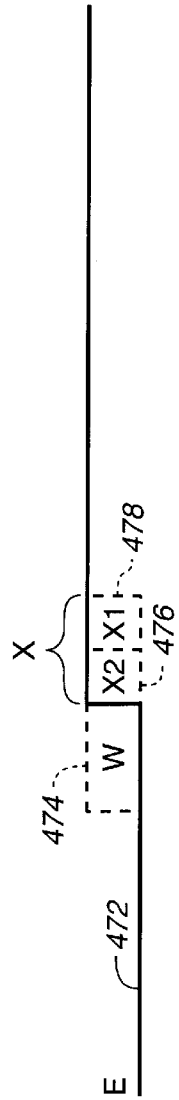
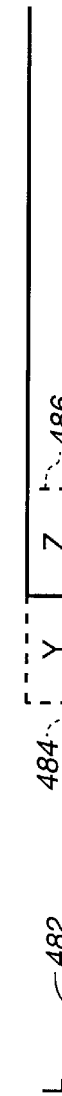
FIG._22A  FIG._22B  FIG._22C  FIG._22D  FIG._22E

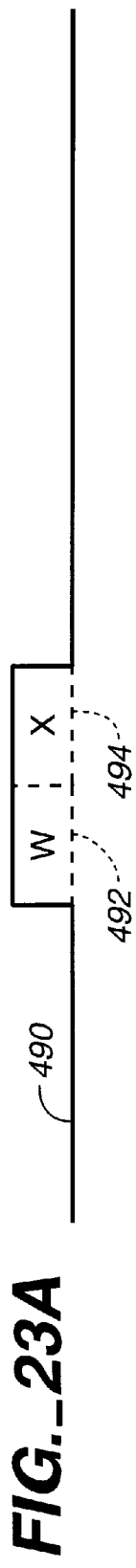
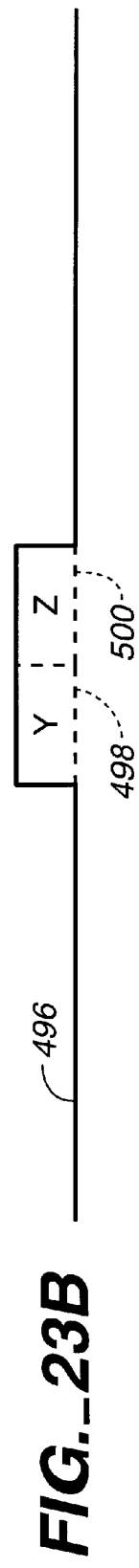
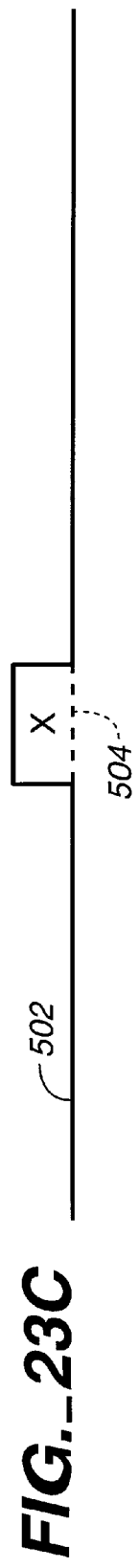
FIG._23A  FIG._23B  FIG._23C  FIG._23D

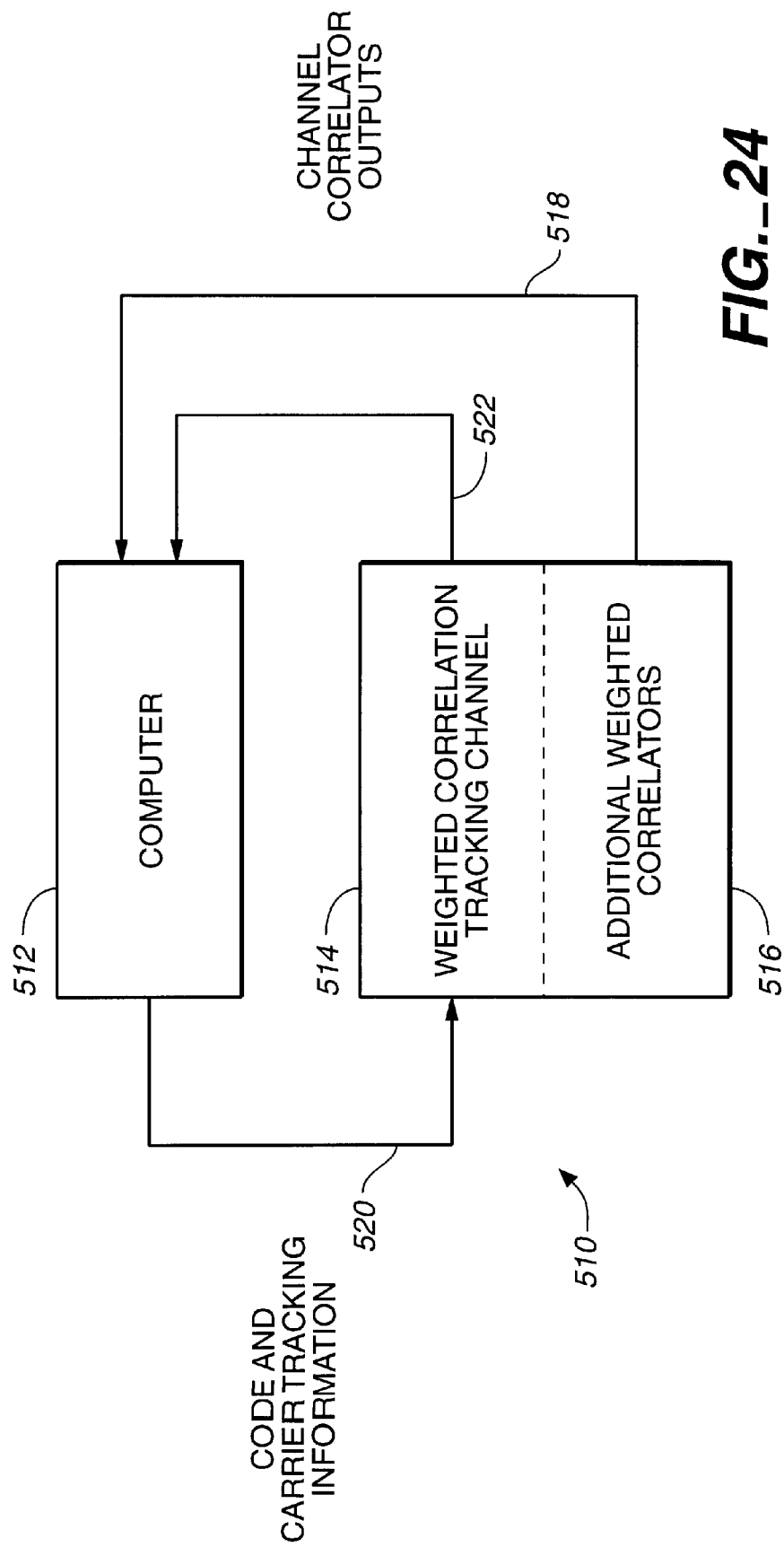
FIG._24

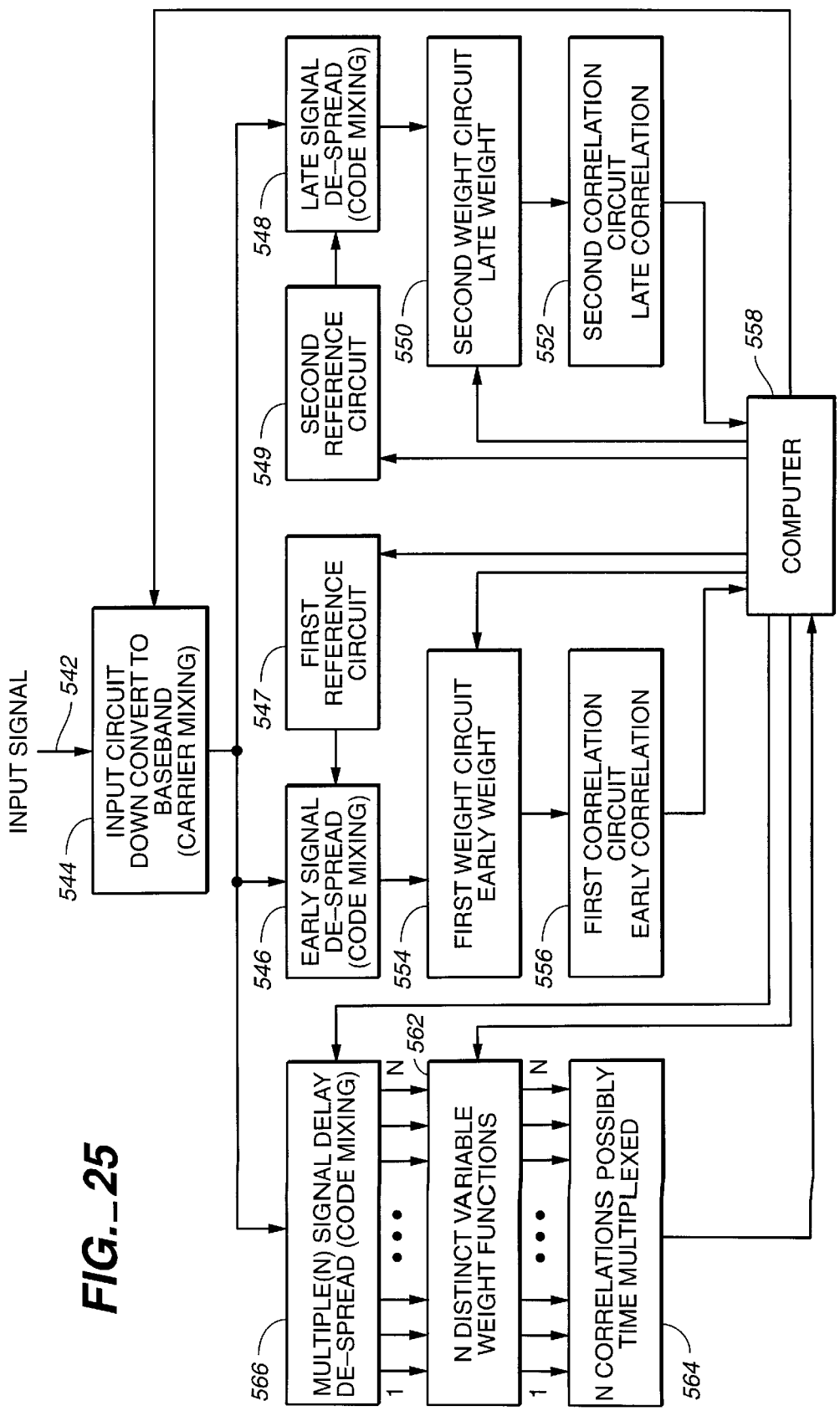
FIG._25

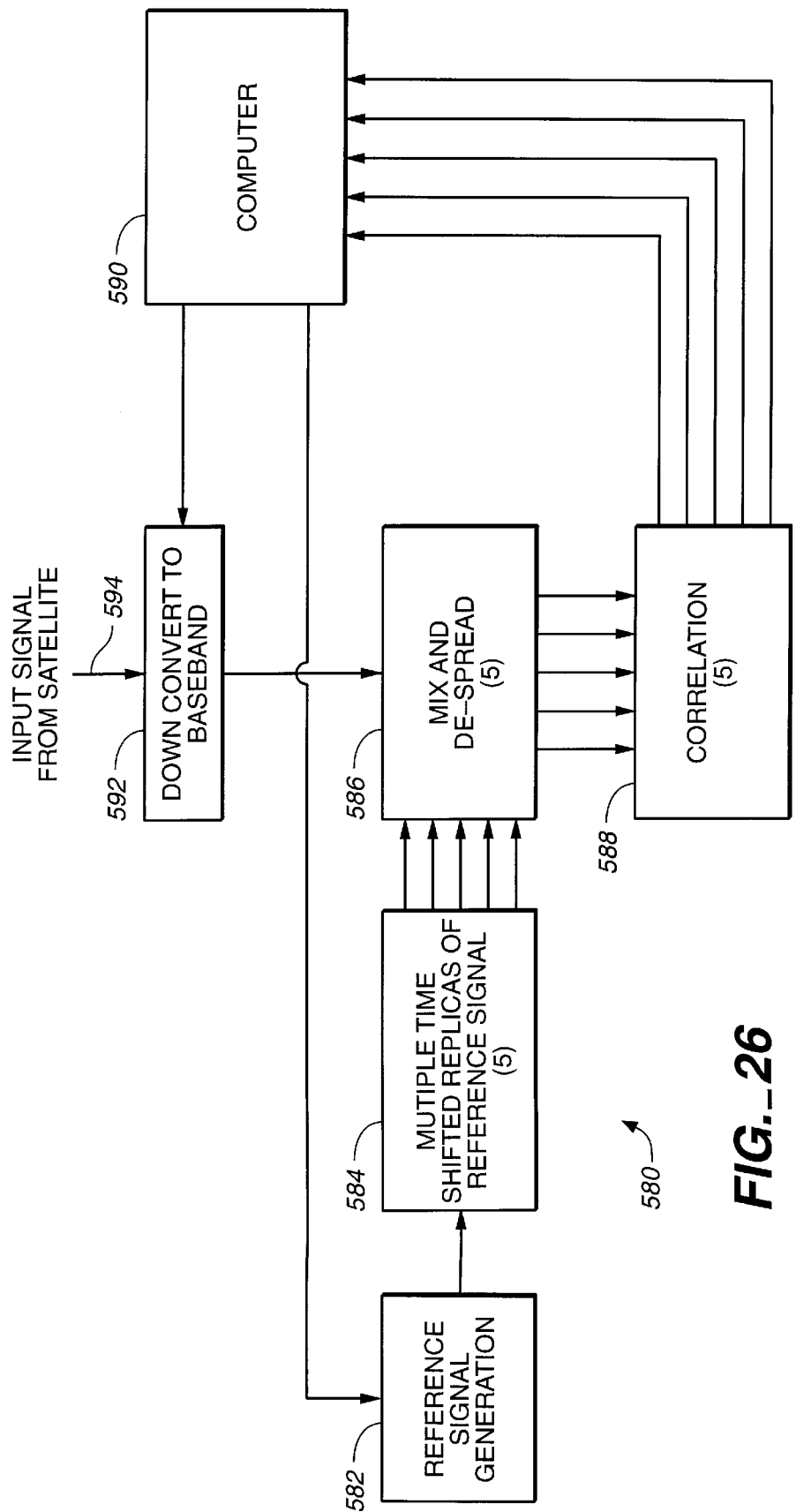
FIG._26

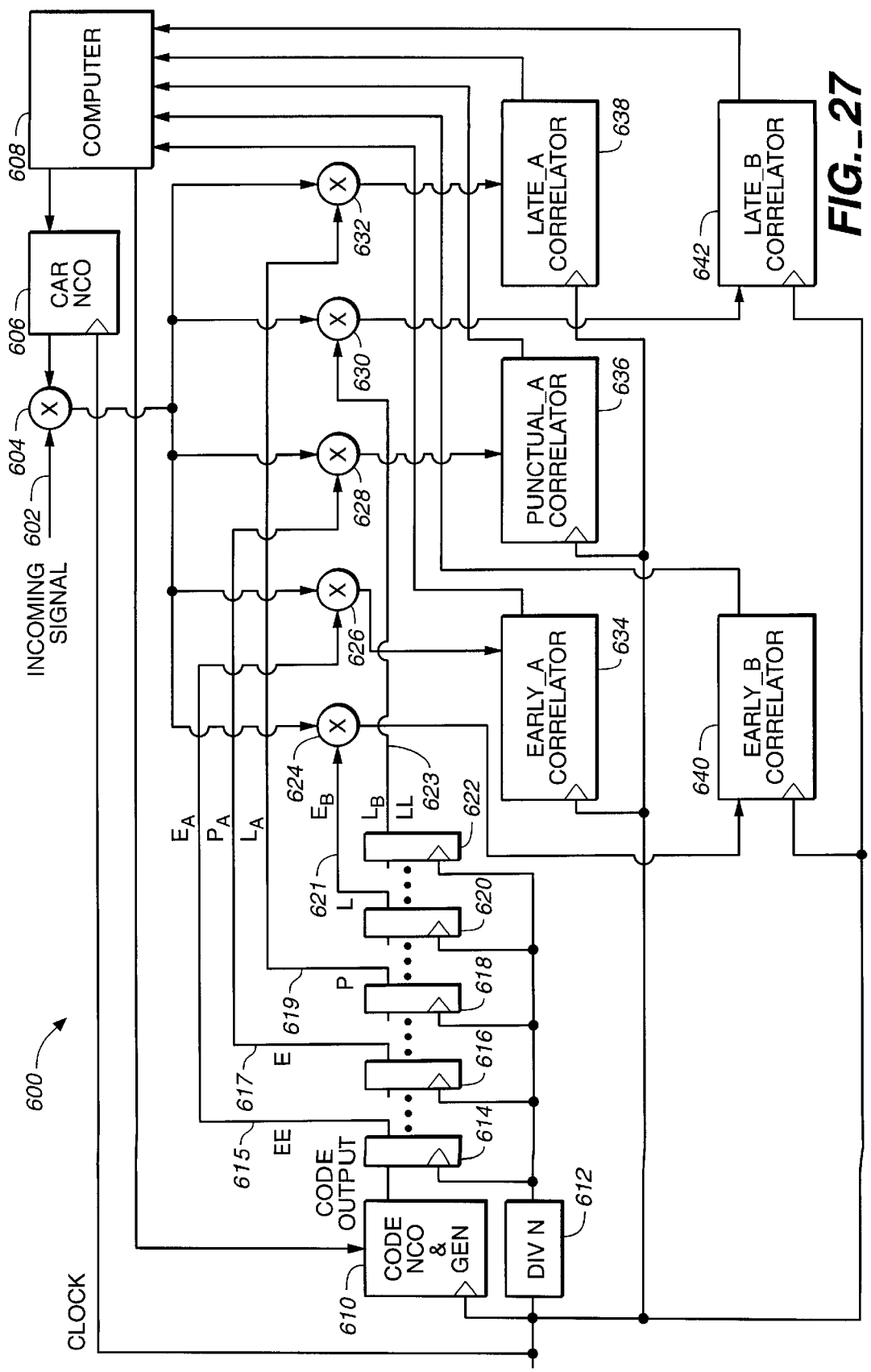
FIG._27

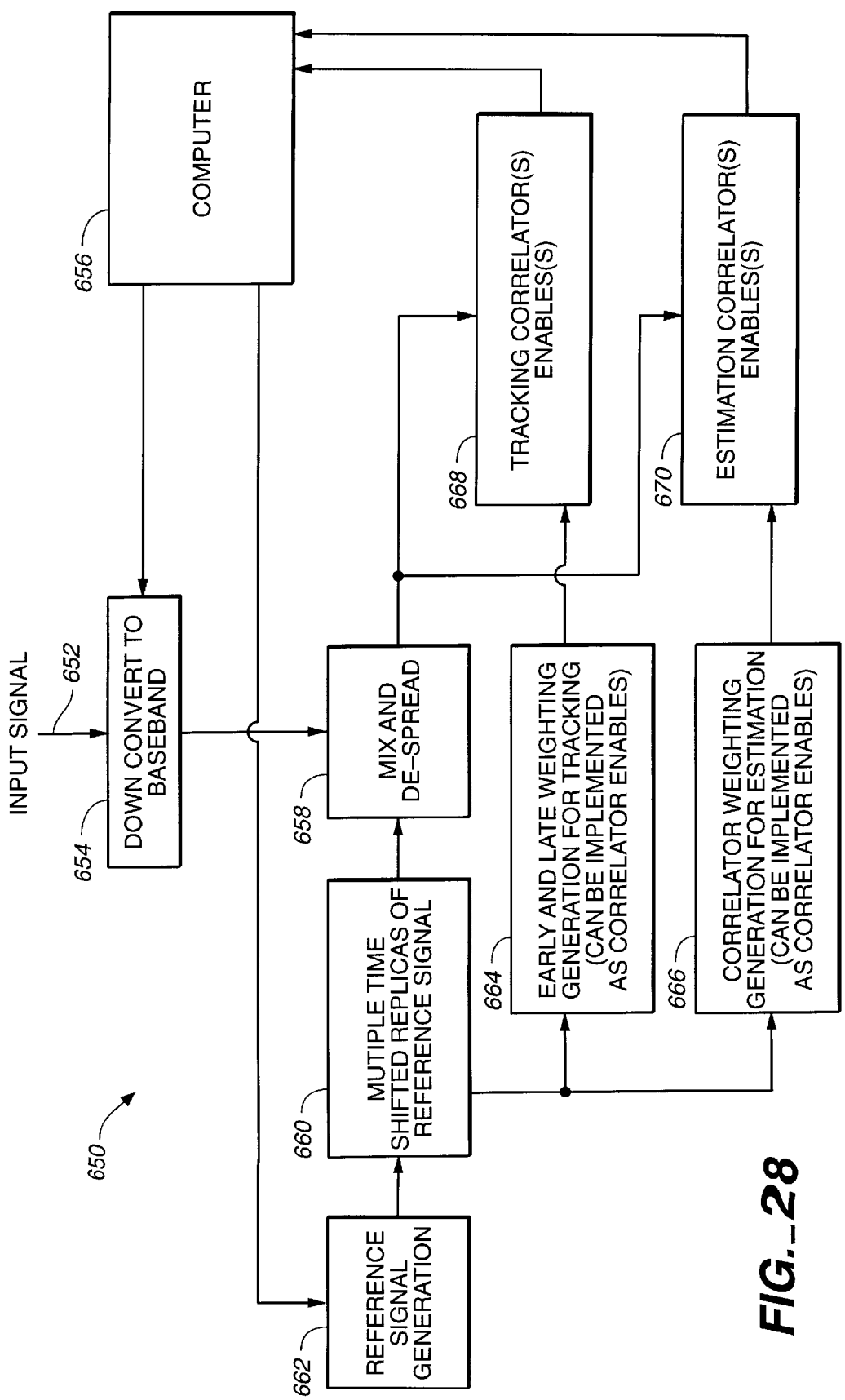
FIG._28

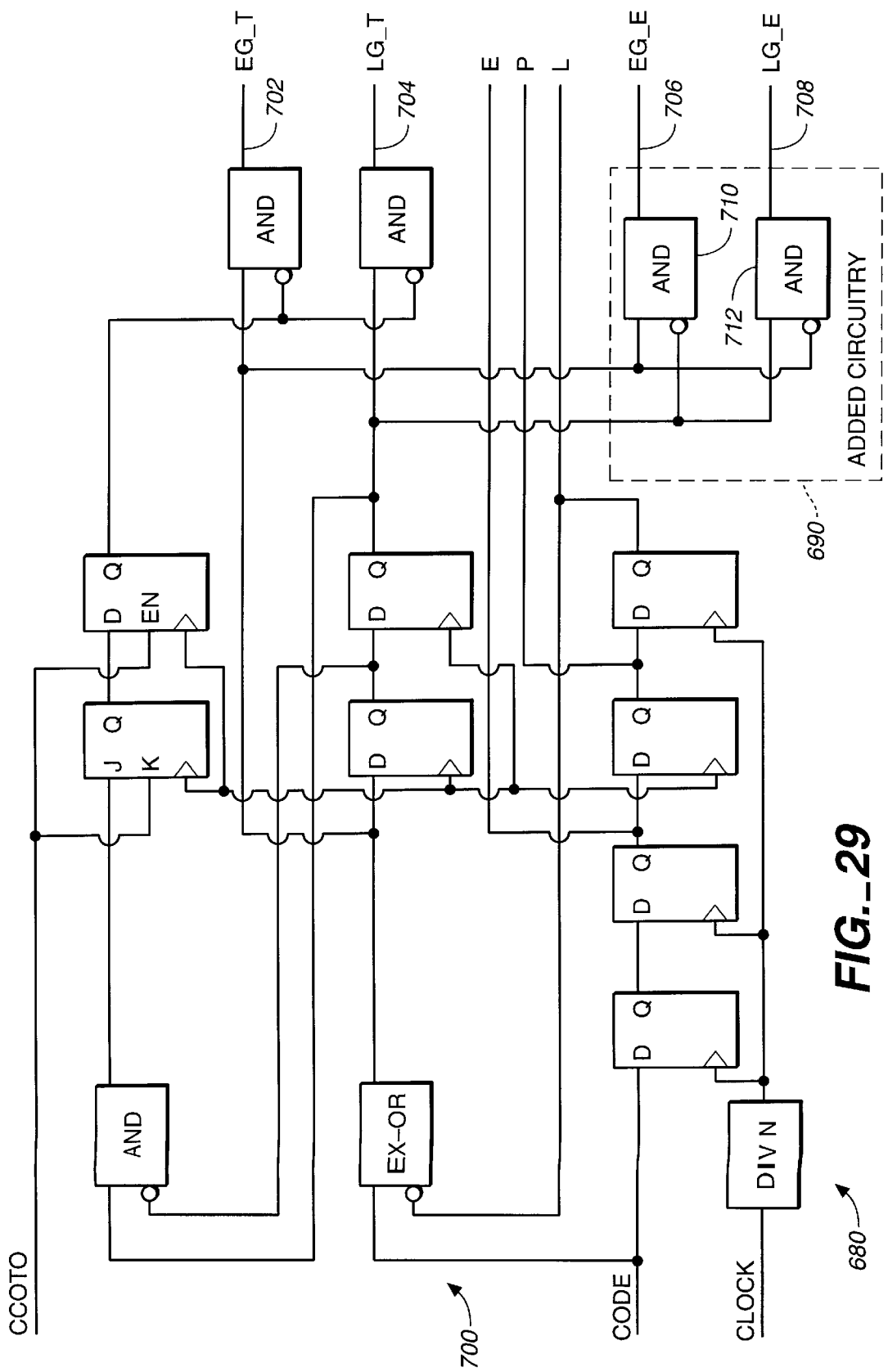
FIG._29

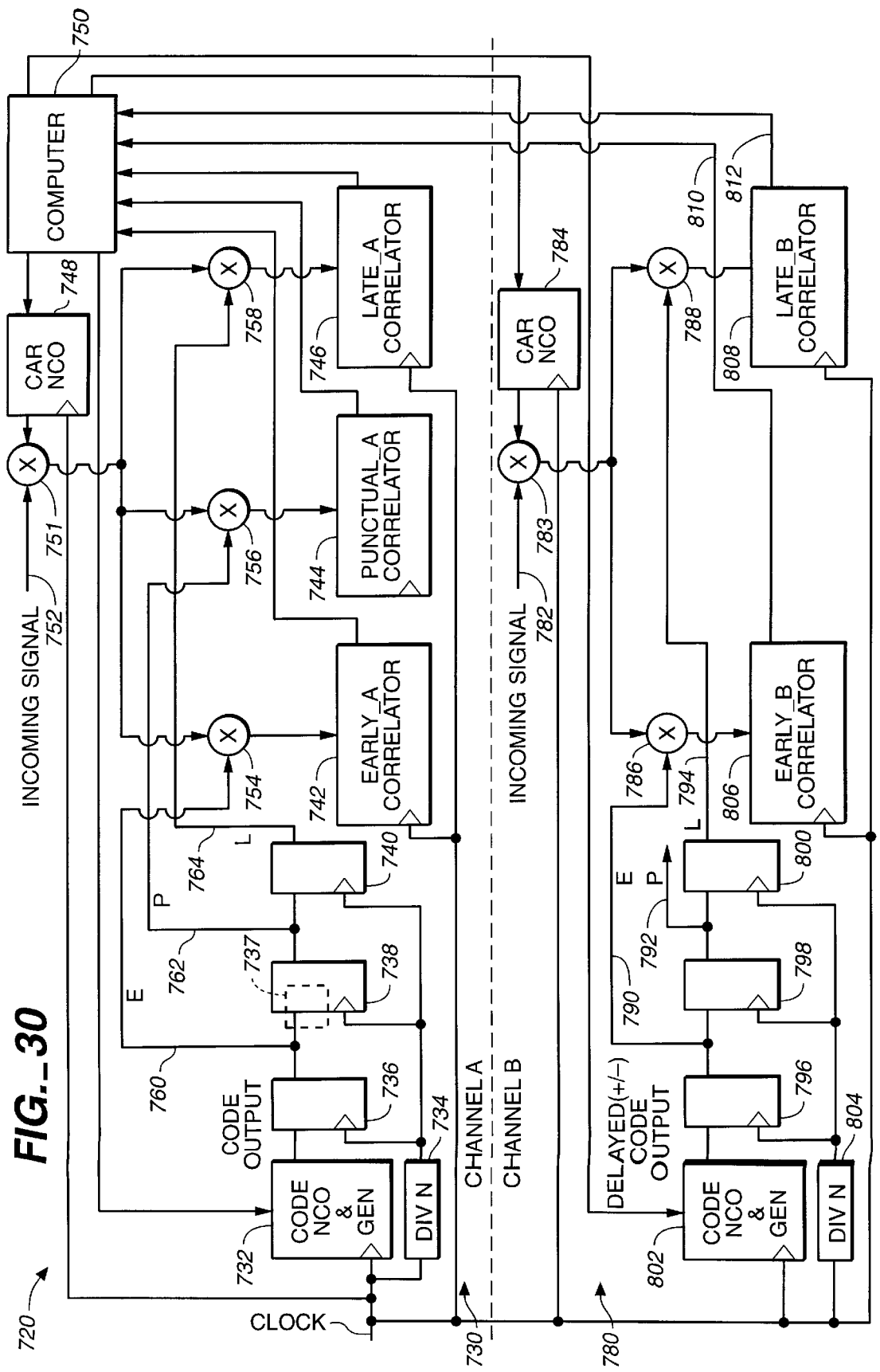
FIG._30

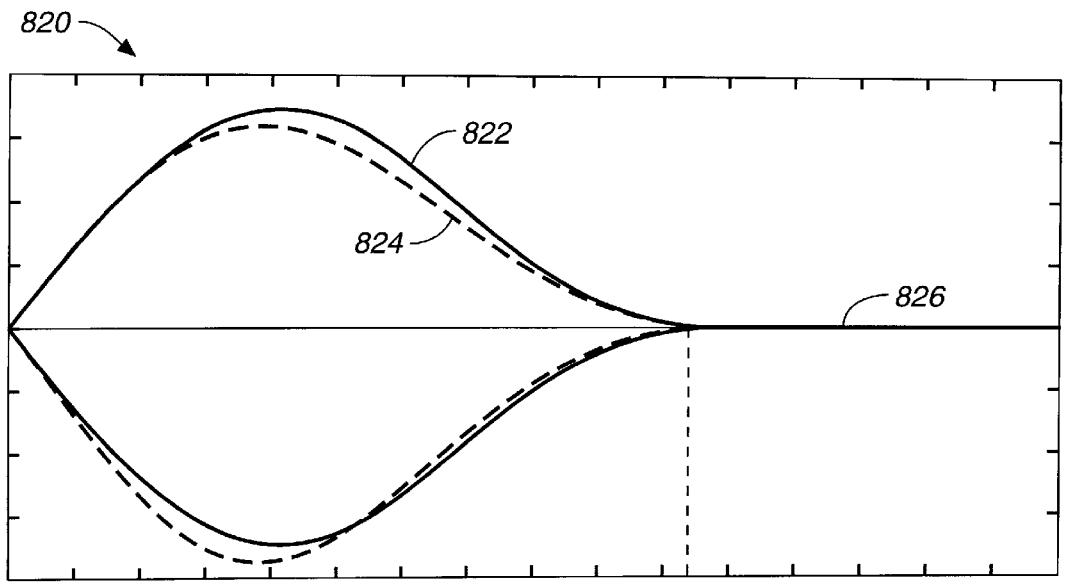
FIG._31A
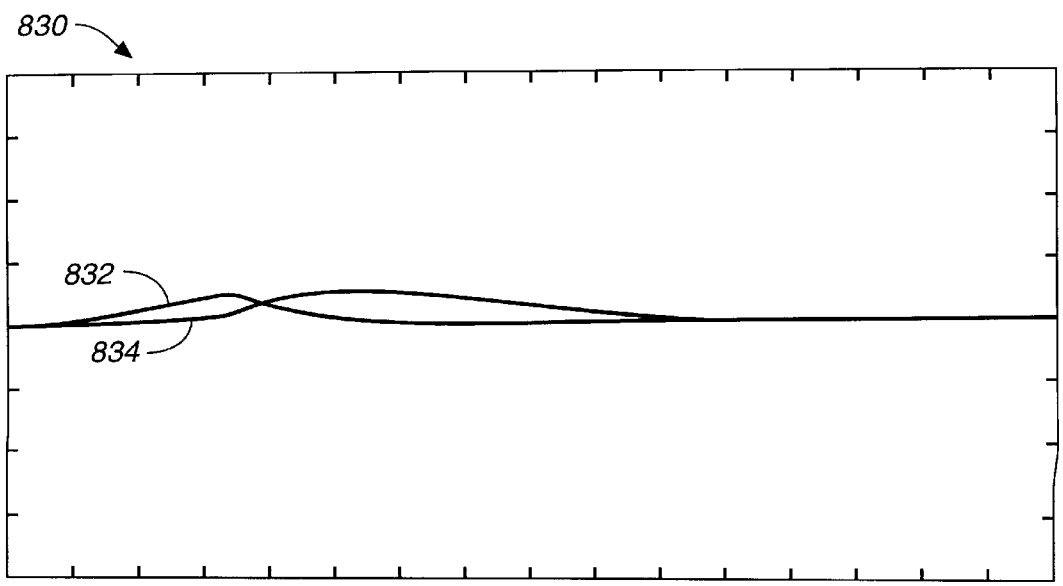
FIG._31B

CODE MULTIPATH ERROR ESTIMATION USING WEIGHTED CORRELATIONS

BACKGROUND

Reference to a Satellite Positioning System or SATPS herein refers to a Global Positioning System (GPS), to a Global Orbiting Navigation System (GLONASS), and to any other compatible satellite-based system that provides information by which an observer's position and the time of observation can be determined.

The Global Positioning System (GPS) is being developed and operated to support military navigation and timing needs at an estimated cost of about $8–10 billion. GPS represents an almost ideal dual-use technology and enjoys increased attention by civilians to explore its suitability for civil applications. The complete GPS system consists of 24 operational satellites and provides 24-hour, all-weather navigation and surveying capability worldwide. A major milestone in the development of GPS was achieved on 8 Dec. 1993, when the Initial Operational Capability (IOC) was declared as 24 satellites were successfully operating.

The implication of IOC is that commercial, national, and international civil users can rely on the availability of the Standard Positioning Service. Current policies quantify SPS as 100-meter, 95% position accuracy for a single user. Authorized (military) users will have access to the Precise Positioning Service (PPS), which provides a greater degree of accuracy. The PPS access is controlled by cryptographic means.

The GPS satellites transmit at frequencies L1=1575.42 MHz and L2=1227.6 MHz modulated with two types of codes and with a navigation message. The two types of codes are the C/A-code and the P-code. SPS is based on the C/A-code, whereas PPS is provided by the P-code portion of the GPS signal. The current authorized level of SPS follows from an intentional degradation of the full C/A-code capability. This measure is called selective availability (SA) and includes falsification of the satellite clock (SA-dither) and the broadcast satellite ephemeris (SA-epsilon), which is part of the navigation message. Despite selective availability, the C/A-code is fully accessible by civilians. On 31 Jan. 1994 the SA was finally implemented. The purpose of SA is to make the P-codes available only to authorized and military users. Users must be equipped with a decryption device or the "key" in order to lock on to P-codes. SA is implemented through a modification of the mathematical formula of the P-code using a classified rule. The encrypted P-code is referred to as the Y-code.

Two types of observables are of interest to users. One is the pseudo-range, which equals the distance between the satellite and the receiver plus small corrective terms due to clock errors, the ionosphere, the troposphere, and the multipath. Given the geometric positions of the satellites (satellite ephemeris), four pseudo-ranges are sufficient to compute the position of the receiver and its clock error. Pseudo-ranges are a measure of the travel time of the codes (C/A, P, or Y).

The second observable, the carrier phase, is the difference between the received phase and the phase of the receiver oscillator at the epoch of measurement. Receivers are programmed to make phase observations at the same equally spaced epochs. The receivers also keep track of the number of complete cycles received since the beginning of a measurement. Thus, the actual output is the accumulated phase observable at preset epochs.

(The above-referenced discussion is provided in the book "GPS Satellite Surveying", Second Edition, authored by Alfred Leick, and published by John Wiley & Sons, Inc. in 1995; pp 1–3).

Both the SPS and PPS address "classical" navigation, where just one receiver observes the satellites to determine its geocentric position. Typically, a position is computed for every epoch of observation.

However, in the surveying and geodesy applications the relative or differential positioning is used, wherein the relative location between the receivers is determined. In this case, many of the common mode errors cancel or their impact is significantly reduced. This is particularly important in the presence of selective availability.

The multipath errors originate with contamination of SATPS signals by delayed versions of these signals. For some applications using either pseudo-range or carrier phase observables, multipath is the dominant error source. The most direct approach for reducing this error is to select an antenna site distant from reflecting objects, and to design antenna/back plane combinations to further isolate the antenna from its surroundings. In some cases, however, antennas must be located in relatively poor sites, and other techniques for code multipath reduction are required.

One such technique for code multipath reduction was disclosed by Rayman Pon in the U.S. Patent application entitled "Suppression Of Multipath Signal Effects", that was assigned to the assignee of the present patent application, and that was filed on May 20, 1996. This patent application is specifically referred to in the present patent application and is incorporated herein by reference.

Another example of such technique for code multipath reduction was disclosed by Rayman Pon, Kreg Martin, and Dominic Farmer in the U.S. Patent application entitled "Variable Suppression Of Multipath Signal Effects", that was also assigned to the assignee of the present patent application, also filed on May 20, 1996. This patent application is specifically referred to in the present patent application and is also incorporated herein by reference.

In both above referenced patent applications the code multipath reduction was based on the utilization of the weighting and correlation means that changed the magnitude and shape of the composite signal autocorrelation function to suppress the contributions of a multipath signal. However, although the multipath signal is suppressed, the residual multipath component signal is still present in the composite signal.

What is needed is the technique that allows to minimize the effect of the residual multipath signal on the composite autocorrelation signal.

SUMMARY OF THE INVENTION

The present invention is unique because it provides an apparatus and a method that allows to minimize the effect of the residual multipath signal on the composite autocorrelation signal.

One aspect of the present invention is directed to an apparatus for use in decoding a composite signal (CS) that includes a distortion component. The apparatus comprises: (1) an input means for down converting to baseband an input satellite signal; (2) a first reference means for generating a first reference signal; (3) a first weighting means for generating a time varying first weighting signal, wherein the first weighting signal is mixed with the composite signal and with the first reference signal; (4) a first correlation means for generating a first correlation signal, wherein the first correlation signal includes a suppressed distortion component, and wherein the first correlation signal includes a residual distortion component; (5) a second reference means for generating a second reference signal; (6) a second weighting means for generating a time varying second weighting signal, wherein the second weighting signal is mixed with the composite signal and with the second reference signal; (7) a second correlation means for generating a second correlation signal; and (8) a computer means for closing the code and carrier tracking loops, for actual estimation of the residual distortion signal in the first correlation signal, and for actual minimization of the residual distortion signal in the first correlation signal.

In the preferred embodiment, the composite signal (CS) includes a transmitted direct signal (DS), and the distortion component includes at least one multipath noise signal (MS).

In one embodiment, the first reference means further comprises a despreading means for despreading the received composite signal CS into two signals, the first signal being an Early composite signal ECS, the second signal being a Late composite signal LCS. The first weighting means further includes an Early weighting function generator means for providing an Early weighting timing function (E^W(t)), and a Late weighting function generator means for providing a Late weighting timing function (L^W(t)); wherein E^ is an Early operator, L^ is a Late operator, and W(t) is a weighting function. The first correlation means further comprises a linear combination of an Early and Late correlator means for generating a correlation waveform (aE+bL)^W(t), wherein "a" and "b" are real numbers, wherein the (aE+bL)^W(t) correlation waveform is utilized to determine a tracking point $t_p$ within a clock time period τ; and wherein the tracking point is distorted from a real tracking point t* because of the presence of the residual distortion signal, and wherein the real tracking point t* is a tracking point in the absence of the residual distortion signal.

The second reference means further comprises a multiple (N) signal delay despreading means for multiple despreading and delay of the received composite signal CS, wherein N reference signals are formed, N being an integer. The second weighting means includes a multiple (N) weight generator means for generating N distinct variable weighting functions. Finally, the second correlation means further comprises a multiple (N) correlator means for generating N correlation functions, wherein N correlation functions are used in the computer means to estimate the residual distortion signal and to minimize the tracking error ($t_p$-t*).

In one embodiment, the first correlation means further comprises a linear combination of an Early and Late correlator means for generating a correlation waveform (E–L)^W(t).

In another embodiment, the first correlation means further comprises: a linear combination of an Early and Late correlator means for generating a correlation waveform (L–E)^W(t).

Yet in one more embodiment, the first correlation means further comprises: a linear combination of an Early and Late correlator means for generating a correlation waveform (E+L)^W(t).

In the preferred embodiment, the second correlation means for generating the second correlation signal further comprises a multiplexing means for generating a plurality of time multiplexed correlator signals.

Another aspect of the present invention is directed to an apparatus for use in decoding a composite signal (CS) comprising a channel A, a channel B, and a computer means.

In the preferred embodiment, the channel A means further comprises: (1) an input (A) means for down converting to baseband an input satellite signal, (2) a reference (A) means for generating a reference (A) signal, and (3) a correlator (A) means for generating a correlation (A) signal. The channel B means comprises: (1) an input (B) means for down converting to baseband an input satellite signal; (2) a reference (B) means for generating a reference (B) signal; and (3) a correlator (B) means for generating a correlation (B) signal, wherein the correlation (B) signal is used to minimize the distortion multipath component signal and the residual distortion multipath component signal. The computer means is used for performing the control function of the A channel means and the B channel means.

In the preferred embodiment, the reference (A) means for generating the reference (A) signal further includes: (1) a code numerically controlled oscillator (NCO) and generator (A) means for locally generating a replica (A) signal of the downconverted incoming satellite signal; and (2) a set of flip-flop means (A) for processing the replica (A) signal and for generating the reference (A) signal. The correlation (A) means for generating the correlation (A) signal further includes: (1) an Early (A) correlator means; (2) a punctual (A) correlator means; and (3) a Late (A) correlator means, wherein the correlator (A) means generates the correlation (A) signal.

In the preferred embodiment, the reference (B) means for generating the reference (B) signal further includes: (1) a code numerically controlled oscillator (NCO) and generator means (B) for locally generating a replica (B) signal of the downconverted incoming satellite signal, wherein the replica (B) signal is shifted in time in relation to the replica (A) signal; and (2) a set of flip-flop means (B) for processing the replica (B) signal and for generating the shifted in time reference (B) signal. The correlation (B) means for generating the correlation (B) signal further includes: (1) an Early (B) correlator means; and (2) a Late (B) correlator means; wherein the correlator (B) means generates the correlation (B) signal that is used for minimizing the distortion component multipath signal and the residual distortion multipath signal.

In one embodiment, the reference (B) means outputs a delayed reference (B) signal as compared with the reference (A) signal. In another embodiment, the reference (B) means outputs an advanced reference (B) signal as compared with the reference (A) signal.

One more aspect of the present invention is directed to one more apparatus for use in decoding a composite signal (CS) that includes a transmitted direct signal (DS) and at least one multipath noise signal (MS). The apparatus comprises: (1) an input means for down converting an input satellite signal to a baseband signal; (2) a reference means for generating a reference signal; (3) a multiple time shifted replicas means for generating a plurality of time shifted replicas of the reference signal, wherein each time shifted replica signal has its own delay as compared with the reference signal; (4) a mixing and despreading means for mixing the baseband signal with each time shifted replica signal and for generating a plurality of mix and despread signals; (5) a correlation means for processing each mix and despread signal and for generating a correlation signal; and (6) a computer means for closing the code and carrier tracking loops, for minimizing the distortion component multipath signal, and for estimation and minimization of the residual distortion multipath signal.

In the preferred embodiment, the multiple time shifted replicas means further comprises five time shifted replicas means for generating five replica signals with different delays, wherein the first replica signal comprises an Early-Early (EE) signal, wherein the second replica signal includes an Early (E) signal, wherein the third replica signal comprises a Punctual (P) signal, wherein the fourth replica signal includes a Late (L) signal, and wherein the fifth replica signal comprises a Late-Late (LL) signal.

Yet, another aspect of the present invention is directed to another apparatus for use in decoding a composite signal (CS) that includes a transmitted direct signal (DS) and at least one multipath noise signal (MS). The apparatus comprises: (1) an input means for down converting an input satellite signal to a baseband signal; (2) a reference means for generating a reference signal; (3) a multiple time shifted replicas means for generating a plurality of time shifted replicas of the reference signal, wherein each time shifted replica signal has its own delay as compared with the reference signal; (4) a mixing and despreading means for mixing the baseband signal with each time shifted replica signal and for generating a plurality of mix and despread signals; (5) an Early and Late weighting means for generating time varying Early and Late weighting signals, wherein the Early and Late weighting signals are mixed with each time shifted replicas of the reference signal; (6) a tracking correlation means for generating a tracking correlation signal, wherein the tracking correlation signal includes a suppressed distortion component and a residual distortion component; (7) an estimation weighting means for generating at least one time varying estimation weighting signal, wherein at least one estimation weighting signal is mixed with each time shifted replicas of the reference signal; (8) an estimation correlation means for generating at least one estimation correlation signal; and (9) a computer means for closing the code and carrier tracking loops, for actual estimation of the residual distortion signal in the tracking correlation signal with a suppressed distortion component, and for actual minimization of the residual distortion signal in the tracking correlation signal.

In the preferred embodiment, the tracking correlation means further includes an enabling means for generating an effective Early and Late tracking weighting function. The estimation correlation means further includes an enabling means for generating an effective estimation weighting function. The estimation weighting means further includes: a first AND means for generating a first component of the estimation weighting function; and a second AND means for generating a second component of the estimation weighting function.

Yet, one more aspect of the present invention is directed to a method for decoding a composite signal (CS) that includes a distortion component. The method comprises the steps of: (1) down converting to baseband an input satellite signal by an input means; (2) generating a first reference signal by a first reference means; (3) generating a time varying first weighting signal by a first weighting means; wherein the first weighting signal is mixed with the composite signal and with the first reference signal; (4) generating a first correlation signal by a first correlation means, wherein the first correlation signal includes a suppressed distortion component, and wherein the first correlation signal includes a residual distortion component; (5) generating a second reference signal by a second reference means; (6) generating a time varying second weighting signal by a second weighting means, wherein the second weighting signal is mixed with the composite signal and with the second reference signal; (7) generating a second correlation signal by a second correlation means; and (8) closing the code and carrier tracking loops, actually estimating the residual distortion signal in the first correlation signal, and actually minimizing the residual distortion signal in the first correlation signal by a computer means.

BRIEF DESCRIPTION OF THE DRAWINGS

FIG. 1A is a plot of a uniform weighting function.

FIG. 1B is a plot of an autocorrelation function.

FIG. 1C illustrates a satellite signal.

FIG. 1D shows a locally generated replica of an incoming satellite signal.

FIG. 1E is a depiction of a multiplied satellite signal and a locally generated replica of a satellite signal.

FIG. 2A shows a satellite signal S(t).

FIG. 2B is an illustration of a time shifted replica of a satellite signal $S(t-\tau 1)$.

FIG. 2C is a depiction of a function $S(t)*S(t-\tau 1)$.

FIG. 2D depicts a timing characteristic of a correlation function $\int S(t)*S(t-\tau)dt$.

FIG. 3A illustrates a uniform weighting function W(t).

FIG. 3B shows a function B(t).

FIG. 3C illustrates a function $W(t)*B(t-\tau)$.

FIG. 4A is a depiction of a Punctual correlation function of the direct satellite signal for uniform weighting.

FIG. 4B shows an Early and a Late correlation functions of the direct satellite signal for uniform weighting.

FIG. 4C is an illustration of an (Early minus Late) correlation function of the satellite signal for uniform weighting.

FIG. 5A depicts a direct correlation function and a positive multipath correlation function.

FIG. 5B illustrates a direct correlation function and a composite correlation function for a positive multipath.

FIG. 5C depicts a direct correlation function and a negative multipath correlation function.

FIG. 5D illustrates a direct correlation function and a composite correlation function for a negative multipath.

FIG. 6A shows an (Early minus Late) direct correlation function and an (Early minus Late) positive multipath correlation function.

FIG. 6B is an illustration of an (Early minus Late) direct correlation function and an (Early minus Late) composite correlation function with a positive multipath.

FIG. 6C shows an (Early minus Late) direct correlation function and an (Early minus Late) negative multipath correlation function.

FIG. 6D is an illustration of an (Early minus Late) direct correlation function and an (Early minus Late) composite correlation function with a negative multipath.

FIG. 7A shows a uniform weighting function.

FIG. 7B illustrates Punctual, Early, and Late direct correlation functions for uniform weighting function.

FIG. 7C is a depiction of an (Early minus Late) direct correlation function for uniform weighting function.

FIG. 8A shows a replica of an incoming satellite signal.

FIG. 8B illustrates an incoming satellite signal.

FIG. 8C depicts a non-uniform weighting function W1(t) with width $\tau_w$ within many chips.

FIG. 8D is a plot of a non-uniform weighting function W1(t) with width $\tau_w$ within one chip.

FIG. 8E shows function $W1(t)*S(t)*S(t-\tau)$ for $\tau=0$.

FIG. 8F illustrates function W1(t)*S(t)*S(t−τ) for small τ<τ$_w$.

FIG. 8G depicts function of FIG. 8F re-distributed over time.

FIG. 9 is an illustration of a pseudo-random sequence.

FIG. 10A shows a replica of an incoming satellite signal.

FIG. 10B illustrates an incoming satellite signal.

FIG. 10C depicts a non-uniform weighting function W2(t) with width τ$_w$ within many chips.

FIG. 10D shows function W2(t)*S(t)*S(t−τ) for large τ>τ$_w$.

FIG. 10E depicts function of FIG. 10D re-distributed over time.

FIG. 10F is a plot of a non-uniform weighting function W2(t) with width τ$_w$ within one chip FIG. 10G illustrates direct correlation function for a non-uniform weighting function.

FIG. 10H illustrates delayed incoming satellite signal.

FIG. 11A illustrates a detailed structure of a direct correlation function for a non-uniform weighting function W2(t) with width τ$_w$.

FIG. 11B depicts a detailed structure of a non-uniform weighting function W2(t) with width τ$_w$.

FIG. 12A illustrates a direct correlation function for a non-uniform weighting function with width τ$_w$ and a multipath correlation function for a non-uniform weighting function with width τ$_w$.

FIG. 12B depicts the δ(t)-function type non-uniform weighting function with width τ$_w$,δ→0.

FIG. 12C illustrates a direct correlation function and a multipath correlation function for uniform weighting.

FIG. 12D shows direct and multipath correlation functions for non-uniform weighting function of FIG. 12E.

FIG. 12E is a depiction of a non-uniform weighting function with width τ$_w$.

FIG. 13A shows an Early and Late direct correlation functions for a non-uniform weighting function.

FIG. 13B illustrates (Early minus Late) direct and composite correlation functions for a non-uniform weighting function.

FIG. 13C depicts an (Early minus Late) multipath correlation function for a non-uniform weighting function.

FIG. 14A shows (Early minus Late) direct correlation functions for a non-uniform weighting function.

FIG. 14B illustrates multipath induced tracking error for uniform and non-uniform weighting functions.

FIG. 15A depicts non-uniform weighting function comprising two parts A and B.

FIG. 15B illustrates function S(t)*S(t−τ).

FIG. 15C shows a correlation function for a non-uniform weighting function of FIG. 15A.

FIG. 15D depicts a correlation function for part A of non-uniform weighting function of FIG. 15A.

FIG. 15E shows a correlation function for part B of non-uniform weighting function of FIG. 15A.

FIG. 16A illustrates a W1 non-uniform weighting function of FIG. 15A.

FIG. 16B is a depiction of a W2 non-uniform weighting function comprising part A of non-uniform weighting function W1 of FIG. 15A.

FIG. 16C shows a Punctual correlation function for a non-uniform weighting function W2 of FIG. 16B.

FIG. 16D depicts an Early correlation function for a non-uniform weighting function W2 of FIG. 16B.

FIG. 16E shows a Late correlation function for a non-uniform weighting function W2 of FIG. 16B.

FIG. 16F illustrates an (Early minus Late) correlation function for a non-uniform weighting function W2 of FIG. 16B.

FIG. 17A shows an Early pseudorandom sequence of replica signal for a non-uniform weighting function of FIG. 17D.

FIG. 17B depicts a Punctual pseudorandom sequence of a replica signal.

FIG. 17C is an illustration of a Late pseudorandom sequence of replica signal for a non-uniform weighting function of FIG. 17E.

FIG. 17D shows a non-uniform weighting function comprising part A and part B.

FIG. 17E illustrates a non-uniform weighting function including parts C and D.

FIG. 18A shows the reference signal for channel A of apparatus of FIG. 30.

FIG. 18B depicts an Early replica signal for uniform weighting for channel A of apparatus of FIG. 30.

FIG. 18C is an illustration of a Punctual replica for uniform weighting for channel A of apparatus of FIG. 30.

FIG. 18D is a plot of a Late replica for uniform weighting for channel A of apparatus of FIG. 30.

FIG. 18E depicts an Early replica signal for uniform weighting for channel B of apparatus of FIG. 30.

FIG. 18F is an illustration of a Late replica for uniform weighting for channel B of apparatus of FIG. 30.

FIG. 18G is a plot of a reference signal for channel B of apparatus of FIG. 30.

FIG. 19A shows the reference signal for channel A of apparatus of FIG. 30.

FIG. 19B depicts an Early replica signal for channel B of apparatus of FIG. 30.

FIG. 19C is an illustration of an Early replica comprising parts W and X of non-uniform weighting function for channel A of apparatus of FIG. 30.

FIG. 19D depicts a Punctual replica for channel A of apparatus of FIG. 30.

FIG. 19E is a plot of a Late replica comprising parts Y and Z for non-uniform weighting function for channel A of apparatus of FIG. 30.

FIG. 19F depicts a Late replica signal for channel B of apparatus of FIG. 30.

FIG. 19G illustrates a non-uniform weighting function for Early replica signal comprising parts X and W.

FIG. 19H depicts a non-uniform weighting function for Late replica signal comprising parts Z and Y.

FIG. 20A shows the reference signal comprising code NCO and generator signal for channel A of apparatus of FIG. 30.

FIG. 20B depicts an Early replica signal for channel B of apparatus of FIG. 30.

FIG. 20C is an illustration of an Early replica used for generating a non-uniform weighting function comprising parts W and X for channel A of apparatus of FIG. 30.

FIG. 20D depicts a Punctual replica comprising parts X1 and X2 of non-uniform weighting function for channel A of apparatus of FIG. 30.

FIG. 20E is a plot of a Late replica comprising parts Y and Z of non-uniform weighting function for channel A of apparatus of FIG. 30.

FIG. 20F depicts a Late replica signal for channel B of apparatus of FIG. 30.

FIG. 21A shows the reference signal comprising code NCO and generator signal for apparatus of FIG. 27

FIG. 21B depicts an Early-Early replica signal for apparatus of FIG. 27

FIG. 21C is an illustration of an Early replica used for generating a non-uniform weighting function comprising parts W and X for apparatus of FIG. 27.

FIG. 21D depicts a Punctual replica for apparatus of FIG. 27.

FIG. 21E is a plot of a Late replica comprising parts Y and Z of non-uniform weighting function for apparatus of FIG. 27.

FIG. 21F depicts a Late-Late replica signal for apparatus of FIG. 27.

FIG. 22A depicts an Early-Early replica signal for apparatus of FIG. 29

FIG. 22B is an illustration of an Early replica used for generating a non-uniform weighting function comprising parts W and X for apparatus of FIG. 29.

FIG. 22C depicts a Punctual replica for apparatus of FIG. 29.

FIG. 22D is a plot of a Late replica comprising parts Y and Z of non-uniform weighting function for apparatus of FIG. 29.

FIG. 22E depicts a Late-Late replica signal of apparatus of FIG. 29.

FIG. 23A shows an Early tracking signal EG_T of apparatus of FIG. 29.

FIG. 23B illustrates a Late tracking signal LG_T of apparatus of FIG. 29.

FIG. 23C depicts an Early estimate signal EG_E of the residual multipath signal of apparatus of FIG. 29.

FIG. 23D depicts a Late estimate signal LG_E of the residual multipath signal of apparatus of FIG. 29.

FIG. 24 shows a general high level architecture for an apparatus for estimation of the residual multipath error signal.

FIG. 25 illustrates a generic architecture of an apparatus for multipath estimation using combinations of weighted correlators.

FIG. 26 depicts a general apparatus for multipath residual estimation using standard correlation technique.

FIG. 27 shows an apparatus with an Early and Late correlator channels for estimation of the residual multipath signal.

FIG. 28 illustrates a general apparatus using weighted correlation.

FIG. 29 depicts a preferred embodiment for an apparatus for estimation of the residual multipath error signal.

FIG. 30 illustrates a two-channel apparatus with uniform weighting functions for estimation of the residual multipath error signal.

FIG. 31A illustrates a computer simulation result comprising the residual multipath signal and the estimation of the residual multipath signal.

FIG. 31B depicts a computer simulation result including a negligible multipath signal that is left after applying the technique of the present invention for compensation of the residual multipath error signal.

FULL DESCRIPTION OF THE PREFERRED EMBODIMENT

In general, the present invention provides an apparatus and a method that allows to minimize the effect of the residual multipath signal on the composite correlation signal. The residual multipath signal is defined as a multipath signal that is still present after applying the techniques developed in the U.S. Patent applications entitled "Suppression of multipath signal effects" (patent application #1) and "Variable suppression of multipath signal effects" (patent application #2) filed on May 20, 1996. These two patent applications are referred to in the present patent application and incorporated by reference herein.

In particular, the present invention can relate to the radio receivers of the satellite signals. Radio receivers for the SATPS navigation data bit stream are commonly referred to as correlation receivers. Correlation receivers are typically employed because they are designed for situations encountered in satellite broadcasting where the strength of the SATPS signal is quite weak compared to the noise level. In order to boost the weak signal without amplifying the noise, it is the practice to use spread spectrum modulation in SATPS satellite systems. The spread spectrum technique modulates the satellite transmission by the individual satellite identification code, and this has the effect of spreading the satellite signal over a bandwidth that is determined by the reciprocal of the pulse width. The receiver multiplies the signal received on the ground by a replica of the individual satellite code, and this kind of demodulation is generally known as correlation. Spread spectrum systems are more fully described by M. Simon, J. Omura, R. Scholtz, and B. Levitt in the "Spread Spectrum Communications Handbook", McGraw-Hill, Inc., 1994.

A particular advantage of using spread spectrum modulation is that it allows the time of arrival of the transmitted signal to be determined by the receiver. The time-of-arrival measurement is used to calculate the pseudo-range, which is the first estimate of the distance between the receiver and a SATPS satellite. The carrier tracking allows one to obtain the second and more precise estimate of the distance between the receiver and a SATPS satellite. Therefore, at first we discuss the correlation process between two codes: the incoming code and the locally-generated code.

Determining the time of arrival of a signal requires the recognition of at least a portion of the incoming signal and a comparison of the time of arrival of the incoming signal with the time that it was known to have been transmitted. This measurement is made by aligning the incoming code and the local code using a code tracking loop, and by multiplying the incoming satellite signal with the locally-generated replica of the spread spectrum code. To produce measurable signal power at the receiver, the incoming signal and the local replica are required to be aligned with each other within one cycle of the code clocking rate. This one cycle at the clocking rate is also referred to as "chip". If the two codes are within one chip of each other, some measurable signal power will be observed at the output of the receiver correlator, and the closer the two codes are aligned, the greater is the power that will be observed. The relationship of the delay time between the two codes to the amount of signal power observed at the output of the correlation operation is called the autocorrelation function (AF). It will be appreciated that peak received power will be detected when the two codes are perfectly aligned in time.

The ideal autocorrelation (10) between two spread spectrum codes (curve 12) is shown in FIG. 1B. The curve 12 is a result of integration of a satellite signal S(t) (16) comprising a pseudorandom sequence (FIG. 1C), multiplied by a shifted in time satellite signal S(t−τ) (18) (FIG. 1D), and multiplied by an uniform weighting function W(t) (14) (FIG. 1A).

The true correlation function between two spread spectrum signals (one such signal being a satellite signal, the other such signal being a generated by an apparatus replica signal) in a real receiver (see curve 30 in FIG. 4A) is different from the ideal curve 12 that has a sharp peak corresponding to an infinite bandwidth (BW→∞). The peak of the curve 30 is not sharp, and the leading and trailing slopes from the peak are not straight. This rounding of the ideal triangular shape is caused by the use of the finite-bandwidth filters in the receiver prior to correlation. The information used to close the code tracking loop and to determine the exact tracking point is taken from an early E autocorrelation function (see 32 in FIG. 4B) and Late L autocorrelation function (see 34 in FIG. 4B). This two correlation functions are used to build an (Early minus Late) correlation function (40 of FIG. 4C). The (E−L) correlation function yields the tracking point $t_p$ (42).

One troublesome kind of interfering signal is known as multipath. Multipath refers to the phenomena in radio wave propagation wherein a receiver system is able to collect a so-called primary (direct) signal, representing the direct path of radio wave propagation between the source and the receiver, and also a plurality of secondary delayed versions of the direct signal, representing reflections of the direct signal from objects adjacent the direct path. This phenomena is particularly acute in receiver systems with large coverage-area antennas, such as commonly found in GPS systems. The magnitude of multipath error induced in GPS systems has been reported by J. M. Tranquilla et al., "GPS Multipath Field Observations at Land and Water Sites", Navigation Journal of the Institute of Navigation, Vol. 37, No. 4, 1990–91.

These secondary signals have been found to have several important characteristics in relation to the direct signal. For example, the secondary signals always have a delayed time-of-arrival compared to the direct signal, because the secondary signals travel a slightly longer path than the direct signal. Furthermore, the respective amplitudes of the secondary signals are nearly always less than that of the direct signal, because the reflections attenuate the direct signal. For correlation receivers using digital modulations, multipath code phase signals with delays greater than one chip are completely uncorrelated, and can be ignored.

The multipath signal distance, that is the differential path length variation from the direct signal path, varies over the wavelength of the code phase. As a result, the multipath code signal can either add (positive multipath) to the desired direct signal or subtract from it (negative multipath).

FIG. 5A illustrates a direct correlation function 58 and a positive multipath correlation function 60. FIG. 5C depicts a direct correlation function 62 and a negative multipath correlation function 64. FIG. 5B shows a composite correlation function 50 for a positive multipath, and FIG. 5D is a depiction of a composite correlation function 54 with a negative multipath. FIG. 5B for positive multipath (and FIG. 5D for negative multipath) shows that the multipath signals causes the composite correlation function to have a larger voltage level (smaller voltage level) at the true tracking time point $t_p$ 53 (55) than the direct correlation function.

The alternative language of the (E−L) correlation function (100 of FIG. 7C) for uniform weighting function (90 of FIG. 7A) is illustrated in FIGS. 6A–6D. The (E−L) direct correlation functions (70, 74, 78, and 82) are depicted together with the (E−L) multipath correlation functions (72 for positive multipath, and 80 for negative multipath), and with the (E−L) composite correlation functions (76 for positive multipath, and 84 for negative multipath).

Use of non-uniform weighting functions introduced in the patent applications #1 and #2 (see discussion above) was very successful in suppressing the multipath signals. The main ideas of the patent applications #1 and #2 are repeated here because they are important for understanding the current patent application.

FIG. 8D illustrates a non-uniform weighting function W1(t) (110) comprising two parts 102 and 104 having width $\tau_w$. The function F(t,τ) of the pseudorandom sequence S(t) with the non-uniform weighting W1(t), that is the function F(t,τ)=W1(t)*S(t)*S(t−τ), is illustrated in FIGS. 8A–8G for low τ<$\tau_w$. The effective re-distribution of the F(t,τ)-function over the time t is shown in FIGS. 8F and 8G.

The F(t,τ)-function is also re-distributed over the time t for large τ>$\tau_w$. (See FIGS. 10A–10E). Thus, the correlation function ∫F(t,τ)dt (140) can be built for all τ. The result is shown in FIG. 10G.

FIG. 12A illustrates the direct (150) and multipath (152) correlation functions for non-uniform weighting function W1(t) comprising two parts 102 and 104 of FIG. 8D. The important result is that in the large range (154) of the multipath delays the multipath signal has no effect at all on the direct (E−L) correlation signal because of the broad plateau in the graph of the multipath correlation function 156. There is no such plateau in the case of uniform weighting function as illustrated in FIG. 12C. Thus, in the case of non-uniform weighting there is an effect of the multipath on the direct signal only for very small delays (region 206 of FIG. 14B) and for very large delays (region 208 of FIG. 14B). The size of regions 206 and 208 of FIG. 14B is proportional to the width $\tau_w$ of the non-uniform weighting function. Therefore, the most beneficial non-uniform weighting function has the least width $\tau_w$ possible. It follows, that the optimum non-uniform weighting function is the δ(t)-function that has width $\tau_w$=δ→0 as shown in FIG. 12B.

FIG. 13A depicts an Early (170) and a Late (172) representation of the direct signal correlation function for the non-uniform weighting. FIG. 13B shows the (E−L) representation of the composite (176) and the multipath (178) correlation functions. As it is discussed above, the multipath has no effect on the tracking point 190 for the large range of multipath delays. Indeed, FIG. 13C shows that between area 182 and area 184 of the (E−L) multipath correlation function there is no effect on the tracking point 186. Thus, the application of the non-uniform weighting in the apparatus disclosed in the patent application #1 resulted in the suppression of the multipath signal in the wide range of the multipath delays.

The apparatus disclosed in the patent application #2 is used to eliminate the 208 area (see FIG. 14B) of the multipath delays. This can be done by choosing different non-uniform weighting functions while receiving different parts of the incoming satellite signals. The present invention is used to minimize the contribution of the area 206 (FIG. 14B) of the multipath delays that is still left after applying techniques from both patent applications #1 and #2.

The idea of the present invention is to estimate the residual multipath error in a certain range of multipath delays (0–1.5 $\tau_w$) shown as region 206 in FIG. 14B, and to remove this residual multipath effect on the tracking point.

If the apparatus of patent application #1 includes a generator of the non-uniform weighting function W1(t) comprising two parts A (214) and B (216) as shown in FIG. 15A, the present invention comprises an apparatus including a generator of a non-uniform weighting function W2(t) comprising only part A of W1(t) weighting function of FIG. 15A. The W2(t) weighting function is used to estimate the residual multipath signals. The direct Punctual correlation function (240) for the weighting function W2(t) is shown in FIG. 16C. One can build both an Early weighted correlation function (242 of FIG. 16D) with an associated correlation M by shifting the Punctual function to the left by one clock (or 0.5 $\tau_w$), and a Late correlation function (244 of FIG. 16E) with an associated correlation N by shifting the Punctual function to the right by one clock (or 0.5 $\tau_w$). Therefore, one can also build the (E–L) correlation function 246 shown in FIG. 16F with an associated weight (M–N). This (E–L) correlation function (see 246 of FIG. 16F) has many of the desired properties of an estimation function used to estimate the residual multipath remaining. These properties are: (a) the section to the left of the tracking point 248 has non-zero width of 3 clocks (or 1.5 $\tau_w$); (b) as multipath delay increases, the multipath signal effect on the tracking point first increases linearly, then decreases linearly, similar to the behavior of the (E–L) composite correlation "tracking" function.

Since the correlation function changes magnitude as a function of input signal-to-noise ratio (SNR), it is useful to normalize. This is accomplished by dividing by normalization factor of signal strength. A bias should be subtracted off to remove the bias value of this function due to the direct signal only with no multipath signal present. This can be done by including an initial offset constant. Finally, after multiplying by an appropriate scaling factor, we can obtain the estimation function that is very similar to the multipath error. This estimation function can be used as an estimate to reduce the effect of the multipath on the tracking point.

Mathematically, we have the following equations:

$$\text{Estimation Function} = MP(est) = F * [(M - N)/N + K];$$

$$\text{New } TP = TP - MP(est) = (TP\_\text{ideal} + MP) - MP(est)$$

$$= \sim TP\_\text{ideal};$$

wherein:

TP is a tracking point with multipath associated with weight W2;

MP is a multipath error associated with weight W2;

TP_ideal is a tracking point with no multipath;

F is a scaling factor;

K is a constant offset;

N is a weighted correlation of W2 Early signal; and

M is a weighted correlation of W2 Late signal.

The apparatus (510) that performs the above identified functions at the high general level is shown in FIG. 24. It includes the weighted correlation tracking channel (514) that is part of the apparatus disclosed in the patent applications #1 and #2. The block 514 tracks the code and carrier satellite direct signals and suppresses the multipath signal. However, the residual multipath signal is still present and affects the tracking point. The additional weighted correlators (516) estimate the residual multipath signal and minimize it using the generator of the specially constructed non-uniform weighting function. The actual estimation and minimization of the residual multipath signal occurs in the computer block 512.

The apparatus (540) employing the generic architecture for multipath estimation using combinations of weighted correlators is shown in FIG. 25. The apparatus of FIG. 25 is more specific than the general apparatus of FIG. 24. The apparatus 540 of FIG. 25 includes the following blocks: (1) a down converter (544) for down converting to baseband an input satellite signal (542); (2) a generator of the first reference signal (546 and 548) for generating a first reference signal; (3) a generator of first weighting signal (554 and 550) for generating a time varying first weighting signal, wherein the first weighting signal is mixed with the composite signal and with the first reference signal; (4) a first correlator (556 and 552) for generating a first correlation signal, wherein the first correlation signal includes a suppressed distortion component, and wherein the first correlation signal includes a residual distortion component; (5) a generator of the second reference signal (560) for generating a second reference signal; (6) a generator of the second weighting signal (562) for generating a time varying second weighting signal, wherein the second weighting signal is mixed with the composite signal and with the second reference signal; (7) a second correlator (564) for generating a second correlation signal; and (8) a computer (558) for closing the code and carrier tracking loops, for actual estimation of the residual distortion signal in the first correlation signal, and for actual minimization of the residual distortion signal in the first correlation signal.

In the preferred embodiment, the composite signal (CS) includes a transmitted direct signal (DS), and the distortion component includes at least one multipath noise signal (MS).

In one embodiment, the generator of the first reference signal further comprises an Early code mixer (546) and a Late code mixer (548). The first weighting generator further includes an Early weighting function generator (554) for providing an Early weighting timing function (E^W(t)), and a Late weighting function generator (550) for providing a Late weighting timing function (L^W(t)); wherein E^ is an Early operator, L^ is a Late operator, and W(t) is a weighting function. In another embodiment, the first correlator further comprises a linear combination of an Early and Late correlators for generating a correlation waveform (aE+bL)^W(t), wherein "a" and "b" are real numbers. The (aE+bL)^W(t) correlation waveform can be utilized to determine a tracking point TP ($t_p$) within a clock time period $\tau$. The tracking point TP ($t_p$) is distorted from the ideal tracking point TP_ideal because of the residual distortion signal, wherein the real tracking point TP_real is a tracking point in the presence of the residual distortion signal.

The generator of the second reference signal further comprises a multiple (N) signal code mixer (560) for multiple despreading and for delaying the reference signal, wherein N reference signals are formed, N being an integer. The generator of the second weighting signal includes a multiple (N) weight generator (562) for generating N distinct variable weighting functions. Finally, the second correlator (564) further comprises a multiple (N) correlator for generating N correlation functions, wherein N correlation functions are used by the computer to estimate the residual distortion signal and to minimize the tracking error (TP_real–TP_ideal).

In one embodiment, the generator of the first correlation signal further comprises a linear combination of an Early and Late correlators for generating a correlation waveform (E–L)^W(t). In another embodiment, the first correlation further comprises a linear combination of an Early and Late correlators for generating a correlation waveform (L–E)^W(t). Yet in one more embodiment, the first correlator further comprises: a linear combination of an Early and Late correlators for generating a correlation waveform (E+L)^W(t).

In the preferred embodiment, the second correlator further comprises a multiplexer for generating a plurality of time multiplexed correlator signals.

FIG. 26 depicts one more embodiment of an apparatus (580) for use in decoding a composite signal (CS) that includes a transmitted direct signal (DS) and at least one multipath noise signal (MS). The apparatus (580) comprises: (1) a down converter (592) for down converting an input satellite signal (594) to a baseband signal; (2) a generator (582) for generating a reference signal; (3) a generator (584) for generating a plurality of time shifted replicas of the reference signal, wherein each time shifted replica signal has its own delay as compared with the reference signal; (4) a mixer (586) for mixing the baseband signal with each time shifted replica signal and for generating a plurality of mix and despread signals; (5) a correlator (588) for processing each mix and despread signal and for generating a correlation signal; and (6) a computer (590) for closing the code and carrier tracking loops, for minimizing the distortion component multipath signal, and for estimation and minimization of the residual distortion multipath signal.

In the preferred embodiment (FIG. 27), the generator (584) of FIG. 26) for generating a plurality of time shifted replicas of the reference signal further comprises five flip-flops (614–622 of FIG. 27) for generating five replica signals with different delays. The first replica signal (615) comprises an Early-Early (EE) signal; the second replica signal (617) includes an Early (E) signal; the third replica signal (619) is a Punctual (P) signal. The fourth replica signal (621) includes a Late (L) signal, and the fifth replica signal (623) comprises a Late-Late (LL) signal.

In the preferred embodiment of apparatus of FIG. 26 depicted as an apparatus (600) of FIG. 27, the correlator (588) of FIG. 26 includes an Early__A correlator (634), a Late__A correlator (638), an Early__B correlator (640), and a Late__B correlator 642 for generating correlation signals with an effective non-uniform weighting function that results in tracking satellite signals with a suppressed multipath component. The residual multipath component is estimated by a correlation signal utilizing an effective non-uniform weighting function generated by a Punctual__A correlator (636), a Late__A correlator (638), and a Late__B (642) correlator. The computer 608 makes the actual estimation and minimizes the residual multipath component. (See discussion below).

Another embodiment of an apparatus of the present invention (650) is depicted in FIG. 28. The apparatus (650) comprises: (1) a down converter 654 for down converting an input satellite signal (652) to a baseband signal; (2) a generator (662) for generating a reference signal; (3) a generator (660) for generating a plurality of time shifted replicas of the reference signal, wherein each time shifted replica signal has its own delay as compared with the reference signal; (4) a mixer (658) for mixing the baseband signal with each time shifted replica signal and for generating a plurality of mix and despread signals; (5) a generator (664) for generating time varying Early and Late weighting signals, wherein the Early and Late weighting signals are mixed with each time shifted replicas of the reference signal; (6) a generator (668) for generating a tracking correlation signal, wherein the tracking correlation signal includes a suppressed distortion component and a residual distortion component; (7) a generator (666) for generating at least one time varying estimation weighting signal, wherein at least one estimation weighting signal is mixed with each time shifted replicas of the reference signal; (8) a generator (670) for generating at least one estimation correlation signal; and (9) a computer (656) for closing the code and carrier tracking loops, for actual estimation of the residual distortion signal in the tracking correlation signal with a suppressed distortion component, and for actual minimization of the residual distortion signal in the tracking correlation signal.

In the preferred embodiment of apparatus of FIG. 28 depicted in FIG. 29 as an apparatus 680, the tracking correlator (668 of FIG. 28) further includes an enabling means for generating an effective Early tracking weighting function EG__T (702) and Late tracking weighting function LG__T (704). For tracking, the EG__T signal (see also 490 of FIG. 23A) is used to gate or enable the correlator which is correlating the Early signal (see 492 of FIG. 22B). The EG__T signal comprises W (492) and X (494) parts. Similarly, the LG__T signal (see 496 of FIG. 23B) is used to gate or enable the correlator which is correlating the Late signal (see 482 of FIG. 22D). The LG__T signal comprises parts Y (498) and Z (500). The code tracking is performed using the difference of these two correlator outputs.

The estimation generator (666 of FIG. 28) further includes a first AND gate (710) for generating an enabling signal EG__E (706) providing an Early estimation weighting function, and a second AND gate (712) for generating an enabling signal LG__E providing a Late estimation weighting function. The EG__E signal (see 502 of FIG. 23C) is used to gate or enable an Early estimation correlator. It contains only part X (504) of EG__T signal because it is an Early enabling signal. The LG__E signal (see also 506 of FIG. 23D) is used to gate or enable a Late estimation correlator. It contains only part Z (508) of LG__T signal because it is a Late enabling signal. The output of the Early estimation correlator is an N correlation result described above. The output of the Late estimation correlator is an M correlation result described above. In one embodiment the Early and Late estimation correlations are performed on dedicated correlators. In another embodiment, the Early and Late estimation correlations are performed on non-dedicated correlators. This is possible because the E and L estimation correlators are used not for tracking purposes, but for multipath estimation purposes only. As shown in FIG. 29, only two AND gates are required to provide the necessary signals (see FIGS. 23A–23D).

Finally, one more embodiment of the apparatus (720) disclosed in the present invention is shown in FIG. 30. The apparatus (720) for use in decoding a composite signal (CS) comprises a channel A (730), a channel B (780), and a computer (750).

The channel A (730) further comprises: (1) a downconverter (751) for down converting to baseband an input satellite signal (752); (2) a channel (A) code NCO and generator (732) for generating a channel (A) reference signal; (3) a plurality of flip-flops (736, 738, and 740) for generating a channel (A) delayed reference signal; and (4) a channel (A) Early (742), Punctual (744), and a Late (746) correlator for generating channel (A) Early, Punctual, and Late correlation signals accordingly.

In the preferred embodiment, the channel (B) outputs a delayed reference (B) signal as compared with the reference (A) signal. The channel B (780) comprises: (1) a downconverter (783) for down converting to baseband an input satellite signal (782); (2) a channel (B) code NCO and generator (802) for generating a reference (B) signal; (3) a plurality of flip-flops (796, 798, and 800) for generating a channel (B) delayed reference signal; and (4) a channel (B) Early (806), and Late (808) correlator for generating channel (B) Early (810) and Late (812) correlation signals. The computer (750) utilizes Early_A, Punctual_A, Early_B, and Late_B correlators for reduced distortion tracking. The computer employs Late_A, Late_B, and Early_B correlators for residual estimation.

In the delayed embodiment, the channel A includes one additional flip-flop (737). In another embodiment, the channel (B) outputs an advanced reference (B) signal as compared with the reference (A) signal.

The performances of the preferred embodiments of the apparatuses of the present invention depicted in FIGS. 27, 29, and 30 can be analyzed in terms of implementation of the generator of non-uniform weighting functions.

At first, we will analyze the performance of the apparatus of FIG. 30 by discussing the implementation the generator of the non-uniform weighting functions by utilizing the generator of uniform weighting functions.

FIG. 17A depicts an Early pseudorandom sequence of the replica of the incoming satellite signal. Parts A (264) and B (262) correspond to parts A (292) and B (294) of the non-uniform weighting function shown in FIG. 17D. Similarly, the Late pseudorandom replica sequence of FIG. 17C includes parts D (282) and C (284) corresponding to parts D (304) and C (302) of the non-uniform weighting function depicted in FIG. 17E. Thus, there is a relationship between structure of a non-uniform weighting function and structure of a pseudorandom sequence.

FIGS. 18A–18G and FIGS. 19A–19H describe the functioning of the apparatus (720) of FIG. 30. The apparatus (720) does not include the non-uniform weighting generators. FIGS. 18A–18G depict the Channel A, Early, Punctual, and Late, and the channel B, Early and Late, composite correlation signals. Those signals correspond to uniform weighting. However, as shown in FIGS. 19A–19H, those correlation signals can be re-organized in such a way as to correspond to non-uniform weighting functions W1 (for Early replica) and W2 (for Late replica) depicted in FIGS. 19G and 19H. The W1 non-uniform function includes regions X (402) and W (404), wherein the W2 non-uniform function includes regions Z (406) and Y (408). There are the following relationships between those regions:

Region W=Early of channel A–Early of channel B;

Region Z=Late of channel A–Late of channel B;

Regular tracking point (Punctual of channel A)=EA–LA (for uniform weighting, it contains full distortion associated with the multipath signal);

Channel A (Early–Late) with non-uniform weighting= (X+W)–(Y+Z)=(X–Y)+(W–Z); wherein (W–Z) contains reduced distortion signal plus residual because we create non-uniform weighting;

Region X=X1+X2~X1; (as shown in FIGS. 20A–20F contribution of region X2 is almost Zero, because it is out of correlation). Thus, the estimation of the residual multipath signal can be performed by analyzing the given above relationships between different regions of the correlation functions as described above. It also follows, that the apparatus of FIG. 30 comprising the apparatus without non-uniform weighting generator effectively functions as if it includes the non-uniform weighting generator. Therefore, the estimation and minimization of the residual multipath signal can be achieved.

Similarly, the functioning of apparatus of FIG. 27 (see FIGS. 21A–21F), and the performance of the apparatus of FIG. 29 (see FIGS. 22A–22E, and FIGS. 23A–23D) can be analyzed.

The apparatus of FIG. 29 functions as follows. As was described above (see FIGS. 22A–22E, and FIGS. 23A–23D), EG_T (702) signal comprises W (492) and X (494) parts. Similarly, the LG_T signal comprises parts Y (498) and Z (500). The EG_E signal contains only part X (504) of EG_T signal because it is an Early enabling signal. The LG_E signal contains only part Z (508) of LG_T signal because it is a Late enabling signal. As shown in FIG. 29, only two AND gates are required to provide the necessary EG_E and LG_E signals using the EG_T and LG_T signals (see FIGS. 23A–23D). Indeed:

X=EG_E=(EG_T) (Logical AND) (LG_T);

Z=LG_E=[(Logical Negation EG_T) (Logical AND) (LG_T)].

FIGS. 31A and 31B represent the results of the computer simulation of the described above technique of using the non-uniform weighting for estimation and minimization of the residual multipath signals (curve 822 of FIG. 31A) left after application of the apparatuses described in the patent applications #1 and #2 (see discussion above). Curve (824) is an estimate of the residual multipath signal obtained using the technique of the present invention. As a result (832 and 834 of FIG. 31B), the multipath signal is minimized and is very close to Zero.

The present invention also includes a method for decoding a composite signal (CS) that includes a distortion component. The method comprises the following steps: (1) down converting to baseband an input satellite signal; (2) generating a first reference signal; (3) generating a time varying first weighting signal; (4) generating a first correlation signal; wherein the first correlation signal includes a suppressed distortion component and a residual distortion component; (5) generating a second reference signal; (6) generating a time varying second weighting signal; (7) generating a second correlation signal; and (8) closing the code and carrier tracking loops, actually estimating the residual distortion signal in the first correlation signal, and actually minimizing the residual distortion signal in the first correlation signal.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for use in decoding a composite signal (CS) that includes a distortion component, said apparatus comprising:

an input means for down converting to baseband an input satellite signal;

a first reference means for generating a first reference signal;

a first weighting means connected to said first reference means for generating a time varying first weighting signal, wherein said first weighting signal is mixed with said composite signal and with said first reference signal;

a first correlation means connected to said first weighting means for generating a first correlation signal, wherein said first correlation signal includes a suppressed distortion component, and wherein said first correlation signal includes a residual distortion component;

a second reference means connected to said input circuit for generating a second reference signal;

a second weighting means connected to said second reference means for generating a time varying second weighting signal, wherein said second weighting signal is mixed with said composite signal and with said second reference signal;

a second correlation means connected to said second weighting means for generating a second correlation signal; and a computer means connected to said first correlation means and connected to said second correlation means for closing the code and carrier tracking loops, for actual estimation of said residual distortion signal in said first correlation signal, and for actual minimization of said residual distortion signal in said first correlation signal.

2. The apparatus of claim 1;

wherein said composite signal (CS) includes a transmitted direct signal (DS); and wherein said distortion component includes at least one multipath noise signal (MS); and wherein said first reference means for generating said first reference signal further comprises:

a despreading means for despreading said received composite signal CS into two signals, said first signal being an Early composite signal ECS, said second signal being a Late composite signal LCS.

3. The apparatus of claim 2;

wherein said first weighting means for generating said first time varying weighting signal further comprises:

an Early weighting function generator means connected to said despreading means for providing an Early weighting timing function (E^W(t)), wherein E^ is an Early operator, and W(t) is a weighting function; and a Late weighting function generator means connected to said despreading means for providing a Late weighting timing function (L^W(t)), wherein L^ is a Late operator.

4. The apparatus of claim 3; wherein said first correlation means further comprises:

a linear combination of an Early and Late correlator means for generating a correlation waveform (aE+bL)^W(t), "a" and "b" being real numbers, and wherein said (aE+bL)^W(t) correlation waveform is utilized to determine a tracking point $t_p$ within a clock time period τ; and wherein said tracking point $t_p$ is distorted from a real tracking point t* because of the presence of said residual distortion signal, and wherein said real tracking point t* is a tracking point in the absence of said residual distortion signal.

5. The apparatus of claim 4; wherein said first correlation means further comprises: a linear combination of an Early and Late correlator means for generating a correlation waveform (E−L)^W(t).

6. The apparatus of claim 4; wherein said first correlation means further comprises: a linear combination of an Early and Late correlator means for generating a correlation waveform (L−E)^W(t).

7. The apparatus of claim 4; wherein said first correlation means further comprises: a linear combination of an Early and Late correlator means for generating a correlation waveform (E+L)^W(t).

8. The apparatus of claim 4;

wherein said second reference means for generating said second reference signal further comprises:

a multiple (N) signal delay despreading means for multiple despreading and delay of said received composite signal CS, wherein N reference signals are formed, N being an integer.

9. The apparatus of claim 8;

wherein said second weighting means for generating said second weighting signal further comprises:

a multiple (N) weight generator means for generating N distinct variable weighting functions.

10. The apparatus of claim 9;

wherein said second correlation means for generating said second correlation signal further comprises:

a multiple (N) correlator means connected to said N multiple weighting function generator means for generating N correlation functions, wherein said N correlation functions are used in said computer means to estimate said residual distortion signal and to minimize said tracking error ($t_p$−t*).

11. The apparatus of claim 10, wherein said second correlation means for generating said second correlation signal further comprises:

a multiplexing means for generating a plurality of time multiplexed correlator signals.

12. An apparatus for use in decoding a composite signal (CS) that includes a transmitted direct signal (DS) and at least one multipath noise signal (MS), said apparatus comprising a channel A means further comprising:
  an input (A) means for down converting to baseband an input satellite signal;
  a reference (A) means for generating a reference (A) signal;
  a correlator (A) means connected to said reference (A) means and connected to said input (A) means for generating a correlation (A) signal;

a channel B means further comprising:
  an input (B) means for down converting to baseband an input satellite signal;
  a reference (B) means for generating a reference (B) signal;
  a correlator (B) means connected to said reference (B) means and connected to said input (B) means for generating a correlation (B) signal, wherein said correlation (B) signal is used to minimize said distortion multipath component signal and said residual distortion multipath component signal; and a computer means connected to said channel A means and connected to said channel B means for performing the control function of said A channel means and said B channel means.

13. The apparatus of claim 12; wherein said reference (A) means for generating said reference (A) signal further includes:

a code numerically controlled oscillator (NCO) and generator means (A) for locally generating a replica (A) signal of said downconverted incoming satellite signal; and a set of flip-flop means (A) connected to said code NCO and generator means (A) for processing said replica (A) signal and for generating said reference (A) signal.

14. The apparatus of claim 13; wherein said correlation (A) means for generating said correlation (A) signal further includes:

an Early (A) correlator means connected to said input (A) means and connected to said code NCO and generator means (A);

a punctual (A) correlator means connected to said input (A) means and connected to said code NCO and generator means (A); and a Late (A) correlator means connected to said input (A) means and connected to said code NCO and generator means (A); wherein said correlator (A) means generates said correlation (A) signal.

15. The apparatus of claim 14; wherein said reference (B) means for generating said reference (B) signal further includes:

a code numerically controlled oscillator (NCO) and generator means (B) for locally generating a replica (B) signal of said downconverted incoming satellite signal, wherein said replica (B) signal is shifted in time in relation to said replica (A) signal; and a set of flip-flop means (B) connected to said code NCO and generator means (B) for processing said replica (B) signal and for generating said shifted in time reference (B) signal.

16. The apparatus of claim 15; wherein said correlation (B) means for generating said correlation (B) signal further includes:

an Early (B) correlator means connected to said input (B) means and connected to said code NCO and generator means (B); and a Late (B) correlator means connected to said input (B) means and connected to said code NCO and generator means (B); wherein said correlator (B) means generates said correlation (B) signal that is used for minimizing said distortion component multipath signal and said residual distortion multipath signal.

17. The apparatus of claim 16, wherein said reference (B) means outputs a delayed reference (B) signal as compared with said reference (A) signal.

18. The apparatus of claim 16, wherein said reference (B) means outputs an advanced reference (B) signal as compared with said reference (A) signal.

19. An apparatus for use in decoding a composite signal (CS) that includes a transmitted direct signal (DS) and at least one multipath noise signal (MS), said apparatus comprising:

an input means for down converting an input satellite signal to a baseband signal;

a reference means for generating a reference signal;

a multiple time shifted replicas means connected to said reference means for generating a plurality of time shifted replicas of said reference signal, wherein each said time shifted replica signal has its own delay as compared with said reference signal;

a mixing and despreading means connected to said multiple time shifted replicas means for mixing said baseband signal with each said time shifted replica signal and for generating a plurality of mix and despread signals;

a correlation means connected to said mixing and despreading means for processing each said mix and despread signal and for generating a correlation signal; and a computer means connected to said input means, connected to said reference means, and connected to said correlation means for closing the code and carrier tracking loops, for minimizing said distortion component multipath signal, and for estimation and minimization of said residual distortion multipath signal.

20. The apparatus of claim 19, wherein said multiple time shifted replicas means further comprises five time shifted replicas means for generating five replica signals with different delays, and wherein said first replica signal comprises an Early-Early (EE) signal, and wherein said second replica signal comprises an Early (E) signal, and wherein said third replica signal comprises a Punctual (P) signal, and wherein said fourth replica signal comprises a Late (L) signal, and wherein said fifth replica signal comprises a Late-Late (LL) signal.

21. An apparatus for use in decoding a composite signal (CS) that includes a transmitted direct signal (DS) and at least one multipath noise signal (MS), said apparatus comprising:

an input means for down converting an input satellite signal to a baseband signal;

a reference means for generating a reference signal;

a multiple time shifted replicas means connected to said reference means for generating a plurality of time shifted replicas of said reference signal, wherein each said time shifted replica signal has its own delay as compared with said reference signal;

a mixing and despreading means connected to said multiple time shifted replicas means for mixing said baseband signal with each said time shifted replica signal and for generating a plurality of mix and despread signals;

an Early and Late weighting means connected to said multiple time shifted replicas means for generating time varying Early and Late weighting signals, wherein said Early and Late weighting signals are mixed with each said time shifted replicas of said reference signal;

a tracking correlation means connected to said Early and Late weighting means for generating a tracking correlation signal, wherein said tracking correlation signal includes a suppressed distortion component and a residual distortion component;

an estimation weighting means connected to said multiple time shifted replicas means said for generating at least one time varying estimation weighting signal, wherein at least one said estimation weighting signal is mixed with each said time shifted replicas of said reference signal;

an estimation correlation means connected to said estimation weighting means for generating at least one estimation correlation signal; and a computer means connected to said tracking correlation means and connected to said estimation correlation means for closing the code and carrier tracking loops, for actual estimation of said residual distortion signal in said tracking correlation signal with a suppressed distortion component, and for actual minimization of said residual distortion signal in said tracking correlation signal.

22. The apparatus of claim 21; wherein said tracking correlation means further includes an enabling means connected to said tracking correlation means for generating an effective Early and Late tracking weighting function.

23. The apparatus of claim 21; wherein said estimation correlation means further includes an enabling means connected to said estimation correlation means for generating an effective estimation weighting function.

24. The apparatus of claim 21; wherein said estimation weighting means further includes:
- a first AND means connected to said Early and Late tracking weighting means for generating a first component of said estimation weighting function; and
- a second AND means connected to said Early and Late tracking weighting means for generating a second component of said estimation weighting function.

25. A method for decoding a composite signal (CS) that includes a distortion component, said method comprising the steps of:
- down converting to baseband an input satellite signal by an input means;
- generating a first reference signal by a first reference means;
- generating a time varying first weighting signal by a first weighting means; wherein said first weighting signal is mixed with said composite signal and with said first reference signal;
- generating a first correlation signal by a first correlation means, wherein said first correlation signal includes a suppressed distortion component, and wherein said first correlation signal includes a residual distortion component;
- generating a second reference signal by a second reference means;
- generating a time varying second weighting signal by a second weighting means, wherein said second weighting signal is mixed with said composite signal and with said second reference signal;
- generating a second correlation signal by a second correlation means; and
- closing the code and carrier tracking loops, actually estimating said residual distortion signal in said first correlation signal, and actually minimizing said residual distortion signal in said first correlation signal by a computer means.

26. A method for decoding a composite signal (CS) that includes a transmitted direct signal (DS) and at least one multipath noise signal (MS), said method comprising the steps of:
- down converting to baseband an input satellite signal by an input (A) means;
- generating a reference (A) signal by a reference (A) means;
- generating a correlation (A) signal by a correlator (A) means;
- down converting to baseband an input satellite signal by an input (B) means;
- generating a reference (B) signal by a reference (B) means;
- generating a correlation (B) signal by a correlator (B) means, wherein said correlation (B) signal is used to minimize said distortion multipath component signal and said residual distortion multipath component signal; and
- performing the control function of said A channel means and said B channel means by a computer means.

27. A method for decoding a composite signal (CS) that includes a transmitted direct signal (DS) and at least one multipath noise signal (MS), said method comprising the steps of:
- down converting an input satellite signal to a baseband signal by an input means;
- generating a reference signal by a reference means;
- generating a plurality of time shifted replicas of said reference signal by a multiple time shifted replicas means, wherein each said time shifted replica signal has its own delay as compared with said reference signal;
- mixing said baseband signal with each said time shifted replica signal and generating a plurality of mix and despread signals by a mixing and despreading means;
- processing each said mix and despread signal and generating a correlation signal by a correlation means;
- closing the code and carrier tracking loops by a computer means;
- obtaining a suppressed distortion multipath signal; and
- estimating and minimizing a residual distortion multipath signal by said computer means.

28. A method for decoding a composite signal (CS) that includes a transmitted direct signal (DS) and at least one multipath noise signal (MS), said method comprising the steps of:
- down converting an input satellite signal to a baseband signal by an input means;
- generating a reference signal by a reference means;
- generating a plurality of time shifted replicas of said reference signal by a multiple time shifted replicas means, wherein each said time shifted replica signal has its own delay as compared with said reference signal;
- mixing said baseband signal with each said time shifted replica signal and generating a plurality of mix and despread signals by a mixing and despreading means;
- generating time varying Early and Late weighting signals by an Early and Late weighting means; wherein said Early and Late weighting signals are mixed with each said time shifted replicas of said reference signal;
- generating a tracking correlation signal by a tracking correlation means, wherein said tracking correlation signal includes a suppressed distortion component and a residual distortion component;
- generating at least one time varying estimation weighting signal by an estimation weighting means, wherein at least one said estimation weighting signal is mixed with each said time shifted replicas of said reference signal;
- generating at least one estimation correlation signal by an estimation correlation means;
- closing the code and carrier tracking loops by a computer means;
- obtaining a suppressed multipath signal;
- actually estimating said residual distortion signal in said tracking correlation signal by said computer means; and
- actually minimizing said residual distortion signal in said tracking correlation signal by said computer means.

* * * * *